US006658597B1

(12) United States Patent
Ker et al.

(10) Patent No.: US 6,658,597 B1
(45) Date of Patent: Dec. 2, 2003

(54) METHOD AND APPARATUS FOR AUTOMATIC RECOVERY OF MICROPROCESSORS/MICROCONTROLLERS DURING ELECTROMAGNETIC COMPATIBILITY (EMC) TESTING

(75) Inventors: Ming-Dou Ker, Hsinchu (TW); Yu-Yu Sung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/425,230

(22) Filed: Oct. 22, 1999

(51) Int. Cl.[7] .................................................. G06F 11/00
(52) U.S. Cl. ......................................... 714/23; 714/14
(58) Field of Search .............................. 714/14, 22, 23, 714/24; 713/340; 327/142, 143

(56) References Cited

U.S. PATENT DOCUMENTS

| | | | |
|---|---|---|---|
| 4,234,920 A | * 11/1980 | Van Ness et al. | .............. 714/22 |
| 4,633,107 A | 12/1986 | Norsworthy | |
| 4,970,408 A | 11/1990 | Hanke et al. | |
| 4,983,857 A | 1/1991 | Steele | |
| 5,111,067 A | 5/1992 | Wong et al. | |

(List continued on next page.)

OTHER PUBLICATIONS

Ming–Dou Ker; "Area–Efficient VDD–to–VSS ESD Clamp Circuit by Using Substrate–Triggering Field–Oxide Device (STFOD) for Whole–Chip ESD Protection, " Proc. of Intl Symp. on VLSI Technolgoy, Systems, and Applications, pp. 69–73, 1997.

(List continued on next page.)

*Primary Examiner*—Robert Beausoliel
*Assistant Examiner*—Bryce P. Bonzo
(74) *Attorney, Agent, or Firm*—Stevens, Davis, Miller & Mosher, LLP.

(57) ABSTRACT

A combined hardware/firmware device and method for automatic recovery of an integrated circuit avoids a disruptive power-on reset after occurrence of an electrostatic discharge which may occur during normal operations or during electromagnetic compatibility testing. The device is incorporated into the chip of the IC and includes an electromagnetic discharge sensor, a flag, and firmware to execute the recovery and reset procedures. The sensor is located between the VDD and VSS lines of the IC which itself includes one or both of a microprocessor and a microcontroller. In a power-on reset sequence, the sensor output and the flag are both set to logic 0. After an electrical transient voltage occurs, the sensor output is set to logic 1. The logic 1 output of the sensor sets the flag, which may be a D flip-flop, to a value of logic 1. When either a power-on reset operation begins or the sensor output is set to logic 1 due to an electrical transient voltage on the VDD-VSS lines, firmware begins a reset subroutine in which (1) the sensor output is reset to logic 0, (2) the status of the flag is checked, (3) if the flag is at logic 1, the firmware performs a recovery procedure to restore predetermined functions of the IC and resets the flag to logic 0 (the recovery procedure being performed on the order of nanoseconds), and (4) if the flag is at logic 0, a general reset procedure is performed. The reset procedure includes a first set of operations and the recovery procedure includes a second set of operations which is different from the first set of operations (for example, a subset or overlapping set). The reset procedure will be disruptive to a user, whereas the recovery procedure involves smooth restoration not noticeable to the user. The apparatus and method permit higher levels of electrostatic discharge to be absorbed by a device without causing permanent damage and/or corrupted data. One particular embodiment for the present invention is for personal computer keyboard microcontrollers.

12 Claims, 18 Drawing Sheets

U.S. PATENT DOCUMENTS

| | | | |
|---|---|---|---|
| 5,136,181 A | | 8/1992 | Yukawa |
| 5,485,111 A | | 1/1996 | Tanimoto |
| 5,654,656 A | | 8/1997 | Geannopoulos |
| 5,724,026 A | * | 3/1998 | Allen .................... 340/635 |
| 5,744,842 A | | 4/1998 | Ker |
| 5,821,787 A | | 10/1998 | McClintock et al. |
| 5,822,515 A | * | 10/1998 | Baylocq .................... 714/56 |
| 5,847,587 A | * | 12/1998 | Chen et al. ................ 327/143 |
| 5,929,672 A | * | 7/1999 | Mitani .................... 327/143 |
| 5,938,770 A | * | 8/1999 | Kim ...................... 713/300 |
| 5,999,392 A | * | 12/1999 | Sung et al. ............... 361/111 |
| 6,141,764 A | * | 10/2000 | Ezell ..................... 713/340 |

OTHER PUBLICATIONS

Ming–Dou Ker; "Whole–Chip ESD Protection Design with Efficient VDD–to–VSS ESD Clamp Circuits for Submicron CMOS VLSI," IEEE Transactions on Electron Devices, vol. 46, No. 1 Jan. 1999, pp. 173–183.

W. T. Rhoades; "ESD Stress on IC'S In Equipment," Electrical Overstress/Electrostatic Discharge Symposium Proceedings, 1990, pp. 82–96.

J. S. Maas, et al.; "Testing Electronic Products for Susceptibility to Electrostatic Discharge," 1990 EOS/ESD Symposium Proceedings, pp. 92–96.

G. Morin, et al.; "ESD–A Problem Beyond The Discrete Component," EOS/ESD Symposium 1992, pp. 1–8.

Ming–Dou Ker, et al.; "Whole–Chip ESD Protection Scheme for CMOS Mixed–Mode IC'S in Deep–Submicron CMOS Technology," IEEE 1997 Custom Integrated Circuits Conference, pp. 31–34.

N. Maene, et al.; "Failure Analysis of CDM Failures in a Mixed Analog/Digital Circuit," Electrical Overstress/Electrostatic Discharge Symposium Proceedings, 1994, Las Vegas, Nevada Sep. 27–29, 1994, Sponsored by: The ESD Association in cooperation with IEEE, pp. 1–8.

Y. Fukuda, et al.; "ESD and Latch Up Phenomena on Advanced Technology LSI," Electrical/Overstress Electrostatic Discharge Symposium Proceedings, Orlando, Florida Sep. 10–12, 1996, Sponsored by: The ESD Association in cooperation with IEEE, Technically co–sponsored by: The Electric Devices Society, EOS/ESD Symposium 1996, pp. 1–9.

* cited by examiner

METHOD AND APPARATUS FOR AUTOMATIC RECOVERY OF MICROPROCESSORS/MICROCONTROLLERS DURING ELECTROMAGNETIC COMPATIBILITY (EMC) TESTING

BACKGROUND OF THE INVENTION

1. Field of the Invention

The present invention relates to recovery of integrated circuits comprising microprocessors (or microcontrollers) which have received an electrical transient voltage resulting from an electrostatic discharge occurring during normal operations or during electromagnetic compatibility testing.

2. Description of the Related Art

Electrostatic discharge (ESD) includes: (1) a localized transfer at the discharge point; (2) inductive coupling between a higher voltage or "charged" object and the discharge object; and (3) electromagnetic radiation from the charged object.

To initiate the correct operations of a microprocessor, a power-on reset circuit is often incorporated within the device to send reset signals to reset the microprocessor to a known state and thus permit execution of the normally desired functions. The failure to power-up in a known state can cause an integrated circuit to function unpredictably. Such unpredictability is particularly undesirable for microprocessors used in, for example, computer keyboards. The following list of U.S. patents and publications provide background information regarding prior art power-on reset circuits; these documents are incorporated by reference herein:

[1] S. R. Norsworthy, "CMOS Power-Up Reset Circuit for Gate Arrays and Standard Cells," U.S. Pat. 4,633,107, December, 1986.
[2] C. C. Hanke, C. D. Obregon, and T. W. Sutton, "CMOS Power-On Reset Circuit," U.S. Pat. No. 4,970,408, November, 1990.
[3] R. C. Steele, "Power-Up Reset Circuit," U.S. Pat. No. 4,983,857, January, 1991.
[4] K. L. Wong and J. D. Schutz, "Power-Up Reset Circuit," U.S. Pat. No. 5,111,067, May, 1992.
[5] A. Yukawa, "Power-On-Reset Circuit," U.S. Pat. No. 5,136,181, August, 1992.
[6] S. Tanimoto, "Power On Reset Circuit with Accurate Detection at Low Voltages,"U.S. Pat. No. 5,485,111, January 1996.
[7] G. L. Geannopoulos, "Power Up Reset Circuit with Threshold Voltage Shift Protection," U.S. Pat. No. 5,654, 656, August, 1997.
[8] C. McClintock and N.Ngo, "Power-On Reset Circuit with Well-Defined Reassertion Voltage," U.S. Pat. No. 5,821,787, October, 1998.

Known prior art power-on circuits can generate a reset signal to initiate the reset of the microprocessors. The main design principle of such power-on-reset circuits is that a time delay concept is used to generate a reset signal pulse when the integrated circuit is in a power-up or transition phase. Some designs have a low-voltage-detection function, whereby the power-on reset circuits can detect a VDD voltage level drop and subsequently generate another reset pulse to reset the microprocessors. However, such prior art power-on-reset circuit designs are able to detect only low-speed VDD derivations in a time period on the order of milliseconds (ms).

Accordingly, so long as the voltage level of the VDD changes over a time period on the order of ms, the prior art power-on-reset circuits can perform adequate detection of the voltage transition required to reset a microprocessor. However, such prior art power-on-reset circuits cannot detect voltage transitions that occur over a shorter period of time on the order of nanoseconds (ns).

Significantly, the electromagnetic compatibility (EMC) verification of electronic products, such as the system-level ESD (electrostatic discharge) test (so-called "ESD zapping"), the monitor arcing test, and the EFT (electrical fast transition) test, often generate electrical pulses with a time scale on the order of nanoseconds (ns). The standard to verify the system-level ESD test is the "IEC 801-2, Electromagnetic Compatibility for Industrial Process Measurement and Control Equipment, Part 2, Electrostatic Discharge Requirements," $2_{nd}$ Edition, 1991. The standard to verify the EFT test is the "IEC 1000-4-4, "Electromagnetic Compatibility (EMC), Part 4, Testing and Measurement Techniques Section 4, Electrical Fast Transient/Burst Immunity Test" $1^{st}$ Edition, 1995. Such fast electrical pulses (also referred to as fast electrical transient voltages) can couple into the internal circuits of a microprocessor through an inductance or capacitance coupling and interfere with the operating instructions temporarily stored in the registers, flip-flops, or RAM of the microprocessor.

When the logic states stored in the registers are changed by a coupled fast electrical pulse, the information stored in the registers may become unintelligible. Furthermore, parity values may no longer match because of corruption of the data. If the corrupted logic states are part of a critical function of the microprocessor, it is likely that the microprocessor will, as commonly referred to in the industry, "lock up," "freeze," "hang," or go into a "continuous loop," while unsuccessfully attempting recovery. It is even possible that a corrupted logic state in the microprocessor caused by a fast electrical pulse may not be discovered until some time afterward when conditions dictate use of those circuits having corrupted logic states. Sometimes, only a complete power-on-reset (which is disruptive to the user) will totally reset all of the latches.

Many products are now being tested for their susceptibility to damage from electrostatic discharge. These electromagnetic compatibility tests may also cause unsuspected problems on the units selected for test. In fact, EMC testing can lead to equipment destruction, yet every circuit during and after the EMC test may remain within the specifications with no apparent permanent parameter changes. However, it is more common that the microprocessor can become upset and/or the electrical system can be frozen after the EMC tests. Most such microprocessors can be restored if the power supply is reset again. However, the executing functions or operating steps of the microprocessor are also reset. In most automated controls for important applications, resetting of the power supply is not an acceptable solution to overcome a detected transient voltage. Therefore, after experiencing electrical interference due to the electromagnetic compatibility verification tests, the microprocessors must recover by themselves without restarting the power supply to achieve an acceptable rating.

Even if an 8-bit microprocessor can sustain a component-level ESD stress of greater than 5 kV , keyboard upset and operational errors have been found in the system-level ESD stress with a 2 kV ESD voltage in the contact-discharge testing method. To meet this system-level ESD specification, some discrete components (such as a magnetic. core, ferrite beads, and RC low-pass circuits) are added into the keyboard circuit board to absorb or bypass the electrical transient due to the system-level ESD test, as shown in the prior art design of FIG. 1.

FIG. 1 shows a prior art system that absorbs or bypasses the transient voltages by including a series of discrete hardware circuits connected to microprocessor 1. Ferrite beads 2 are connected to VDD 3 and to VSS 4. An RC network may also be employed. A series of capacitors 5 coupled to the lines containing the ferrite beads 2 or the resistors 2a provide a high frequency short to VSS so that high frequency transient voltages are bypassed. Low frequency voltages representing digitized information pass freely. The keyboard cable 6 comprises a group of current carrying wires that are wrapped around a magnetic core 7 and then connected to the ferrite beads 2 and resistor 2a. A high frequency voltage transient will be dropped across (i.e. absorbed by) magnetic core 7 to protect the microprocessor 1 from a transient voltage traveling down the keyboard cable. Some of the drawbacks to this prior art system include the requirement for expensive and bulky discrete components such as the magnetic core and ferrite beads.

Another prior art power-on-reset circuit is disclosed in reference [3]. This circuit is designed so that a logic 1 output will cause an asynchronous reset of all of the registers on the microprocessor. However, such circuits are nominally designed for a delay of the reset signal to ensure that the supply voltage and all circuits have reached stable operating voltages. The delay is often longer than the rise time of the supply voltage.

Accordingly, such power-on-reset circuits disclosed in the aforementioned background references cannot respond to fast electrical pulses. Even if the microprocessors have included such power-on-reset circuits in their chips, they still can be upset or frozen during the electromagnetic compatibility tests.

In some prior art system-level designs, extra external hardware circuits are used as a reference to verify the execution of instructions and to restore normal conditions in the microprocessors if abnormal conditions are detected. In order to prevent the keyboard from being upset or frozen after a system-level ESD zapping test, the microprocessor should have an auto-detection function in the integrated circuit (IC), so that the microprocessor can be automatically reset and restored gradually to a known and stable state. The firmware must perform a regular status check for abnormal conditions. An effective method to assist the firmware in the status check is to use an external hardware timer, such as the retriggerable monostable multivibrator, as shown in FIG. 2.

FIG. 2 shows an example of a prior art power-on reset circuit from "Noise Reduction Techniques in Electronic Systems," H. W. Ott, $2^{nd}$ Edition, John Wiley & Sons, 1988. A series of flip-flops 8 are used to provide a reset pulse on line 9 to a microprocessor (not shown) in conjunction with a change in the level of both VCC 10 and a sanity pulse on line 11. However, this method also requires extra circuits (such as a 74LS123 multivibrator) and additional components on the circuit board to assist in the recovery of the microprocessor, often increasing costs.

In other prior art designs, a hardware circuit called a "Watchdog Timer" is added to the microprocessor to check the instruction execution and restore the normal conditions with the cooperation of a firmware design. A Watchdog Timer remains in a reset state as long as an application or device is functioning properly. Periodically, a rest command is sent to a time delay portion of the Watchdog Timer. Should an application "lock up" or "freeze," it will be unable to send additional reset pulses to the time delay portion.

Thus, the time delay portion subsequently "times out" after a predetermined interval and opens or closes a contact which permits the reset command to be sent to reset the device.

However, the logic states of the Watchdog Timer are still stored in the registers or flip-flops, and they also may be interfered with and changed by the fast electrical pulses to cause an upset of the microprocessors. When the fast electrical pulse has a higher glitch level, the microprocessors associated with the Watchdog Timer circuits still can be frozen.

Moreover, when a fast electrical transient having a high-level voltage occurs, the logic states stored in the counters, the registers, the memory, or the flip-flops in the microprocessor are totally destroyed. Therefore, the program instructions in the keyboard may still lock-up in an infinite loop from which it can not escape, even if a Watchdog Timer has been included. The infinite loop causes the keyboard to become upset or frozen after receipt of the system-level ESD zapping. The keyboard can recover only if the hardware reset is manually restarted again. Such a manual restart is not acceptable for keyboard products certified by the "CE" mark (CE is an acronym of the French phrase "Conformite Europeene"). Therefore, the discrete components shown in FIG. 2, and a more complex redesign on the board layout, must be incorporated into the keyboard circuit board to absorb or bypass the electrical transient. If the keyboard is required to sustain a much higher value of system-level ESD zapping, more expensive discrete components must be used, but the keyboard operations may still become upset under some ESD testing conditions.

Moreover, a microprocessor fabricated in the scaled-down CMOS process with a much smaller die size is more sensitive to electrical transients. Additional, or larger, magnetic cores and ferrite beads are used on the keyboard circuit board to restrain the electrical transient generated from the system-level ESD test. However, such additional discrete components substantially increase the total cost of the keyboard. Therefore, a microcontroller with robust system-level ESD susceptibility for high frequency transient voltages and on-chip automatic recovery, which does not require the expensive additional discrete components on the circuit board, is strongly desired by keyboard manufacturers and the public at large.

SUMMARY OF THE INVENTION

The present invention is directed to providing an effective on-chip ESD sensor to detect system-level electrical transient voltages while enabling resumption of normal operations without a general power-on reset that severely disrupts system operation.

According to one aspect of the present invention, there is provided a device for automatic recovery of an integrated circuit after occurrence of an electrostatic discharge received by the integrated circuit, the integrated circuit comprising at least one of a microprocessor and a microcontroller and having a VDD line and a VSS line, the device being included in the chip of the integrated circuit. The device comprises an electrostatic discharge sensor means, connected between the VDD and VSS lines, for sensing an electrostatic discharge voltage, associated with the electrostatic discharge, on the VDD and VSS lines, and for generating a sensor output signal when the electrostatic discharge voltage is sensed; an electrostatic discharge flag means for, in response to the sensor output signal, outputting a flag signal indicating sensing of the electrostatic voltage by the sensor means; and control means for (i) performing a reset procedure on the integrated circuit in response to power-on of the integrated circuit and (ii) performing a recovery procedure to restore predetermined functions of the integrated circuit in response to the flag signal indicating sensing of the electrostatic voltage by the sensor means. The reset procedure can comprise a first set of operations and the recovery procedure a second set of operations which is different from the first set of operations. The second set of operations can be one of (1) a subset of or (2) an overlapping set of the first set of operations. In the keyboard, when the keyboard is upset by the system-level ESD Zapping, the original operation instruction or operating states in the keyboard can be recovered by down-loading the original states that were stored in the PC system. The sensor means can include a plurality of electrostatic discharge sensors located at a plurality of different positions within the integrated circuit, and the device can further comprise logic means for logically combining outputs of the plurality of electrostatic discharge sensors to provide a logical input to the electrostatic discharge flag means. The logic means can comprise an OR gate, a NAND gate, or other type of logic gate, and the electrostatic discharge flag means can be e.g. a flip-flop such as a D flip-flop. The plurality of electrostatic discharge sensor means can comprise a first electrostatic discharge sensor having a larger NMOS width/length (W/L) ratio than its PMOS WIL ratio and a second electrostatic discharge sensor having a larger PMOS W/L ratio than its NMOS WIL ratio.

According to the present invention, a combined hardware/firmware system automatically recovers a microprocessor during electromagnetic compatibility tests. By including special ESD sensors and an electrostatic discharge flag on-chip in the integrated circuit including the microprocessor or microcontroller, a coupled fast electrical pulse from either a system-level ESD zapping or an electrical fast transition test on the microprocessor/microcontroller can be detected.

According to an embodiment of the present invention, an on-chip automatic recovery apparatus for an integrated circuit including a microprocessor/microcontroller comprises an electrostatic discharge sensor comprising a plurality of latch logic gates, and an electrostatic discharge flag electrically connected to an output of the electrostatic discharge sensor.

According to another embodiment of the present invention, the electrostatic discharge sensor comprises two latch logic gates for detecting the system-level electrical transient voltage. The logic gates have their outputs connected to the input of an OR gate (or a NAND gate), and the output of the OR gate is connected to the input of the electrostatic discharge flag.

The number of latch logic gates can be increased for placement throughout different areas of the microprocessor for more effective ESD protection than placement at merely the input or output areas. Accordingly, the number of input lines of the OR gate should increase with corresponding number of latch logic gates.

According to yet another embodiment of the present invention, the first latch logic gate is designed so that the NMOS has a width-to-length (W/L) ratio larger than that of its PMOS to cause the latch to lock easily at logic 0. In contrast, the second latch is designed so that the PMOS having a larger W/L ratio than that of its NMOS to cause the latch to lock easily at logic 1. The firmware stored in the ROM of the microprocessor automatically checks the electrostatic discharge flag (which is typically a flip-flop such as a D flip-flop) to monitor the abnormal conditions in the system operation. If the microprocessor becomes upset or is locked up by a system-level ESD transient voltage, or by the electrical fast transition test (EFT), the microprocessor is recoverable quickly to a known and stable state.

The microcontroller having a combined hardware/firmware device is fabricated in a 0.45 $\mu$m CMOS process. The system-level ESD susceptibility level of the 8-bit microcontroller used in keyboard products has been improved from an original 2 kV or 4 kV value to become greater than an 8 kV or 15 kV value, depending on whether the respective contact-discharge or air-discharge methods of ESD zapping are used.

According to another aspect of the present invention, there is provided a method of performing an automatic recovery procedure for an integrated circuit after occurrence of an electrostatic discharge received by the integrated circuit, the integrated circuit having a VDD line and a VSS line and comprising at least one of a microprocessor and a microcontroller. The method comprises the steps of starting the integrated circuit by a power-on reset sequence including setting an electrostatic discharge flag at a first logic state; sensing an electrostatic discharge voltage on the VDD and VSS lines; changing the electrostatic discharge flag to a second logic state in response to the sensing of the electrostatic discharge voltage on the VDD and VSS lines; performing a recovery procedure to restore predetermined functions of the integrated circuit in response to the flag being set in step (b) to the second logic state; and thereafter, resetting the flag to the first logic state. The reset procedure comprises a first set of operations and the recovery procedure comprises a second set of operations which is different from the first set of operations. The second set of operations can be one of (1) a subset of or (2) an overlapping set of the first set of operations.

In another variation of the above method, a plurality of electrostatic discharge sensors are employed and are located at different locations on the integrated circuit including the microprocessors/microcontroller and have their outputs tied together at an input of the electrostatic discharge flag. Another option is to employ more than one electrostatic discharge flag.

The electrostatic discharge flag may comprise a flip-flop such as a D flip-flop and the outputs of the plurality of electrostatic discharge sensors can be tied together through, for example, an OR or NAND gate. If any of the electrostatic discharge sensors change their status from logic 0 to logic 1, this change will be input to the electrostatic discharge flag by setting, for example, a flip-flop such as a D flip-flop to logic 1. The logic 1 output of the OR (or NAND) logic gate also activates the firmware recovery procedure of the microprocessor/microcontroller.

By way of overview, the present invention provides a combined hardware/firmware device and method for automatic recovery of an integrated circuit the invention avoids a disruptive power-on reset after occurrence of an electrostatic discharge which may occur during normal operations or during electromagnetic compatibility testing. The device is incorporated into the chip of the IC and includes an electromagnetic discharge sensor, a flag, and firmware to execute the recovery and reset procedures. The sensor is located between the VDD and VSS lines of the IC which itself includes one or both of a microprocessor and a microcontroller. In a power-on reset sequence, the sensor output and the flag are both set to logic 0. After an electrical transient voltage occurs, the sensor output is set to logic 1. The logic 1 output of the sensor sets the flag, which may be a flip-flop such as a D flip-flop, to a value of logic 1. When either a power-on reset operation begins or the sensor output is set to logic 1 due to an electrical transient voltage on the VDD-VSS lines, firmware begins a reset subroutine in which (1) the sensor output is reset to logic 0, (2) the status of the flag is checked, (3) if the flag is at logic 1, the firmware performs a recovery procedure to restore predetermined functions of the IC and resets the flag to logic 0 (the recovery procedure being performed on the order of nanoseconds), and (4) if the flag is at logic 0, a general reset procedure is performed. The apparatus and method permit higher levels of electrostatic discharge to be absorbed by a device without causing permanent damage and/or corrupted data. One particular embodiment for the present invention is for personal computer keyboard microcontrollers.

DESCRIPTION OF THE PREFERRED EMBODIMENTS

Figure 1:
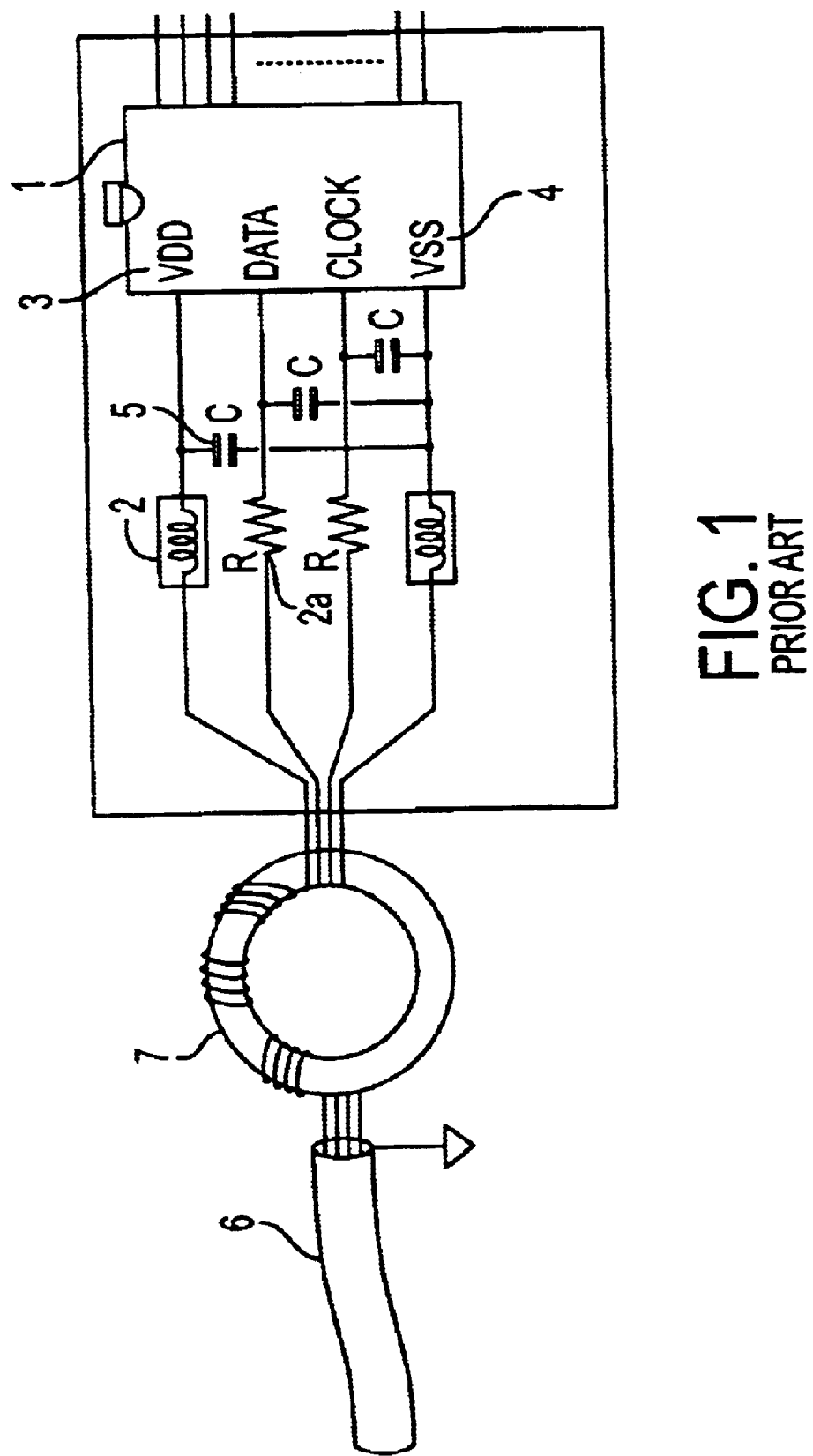
FIG. 1 shows a prior art electrostatic discharge recovery apparatus for an integrated circuit including a microprocessor/microcontroller that uses additional external discrete components as a means to bypass or absorb a transient voltage.
Figure 2:
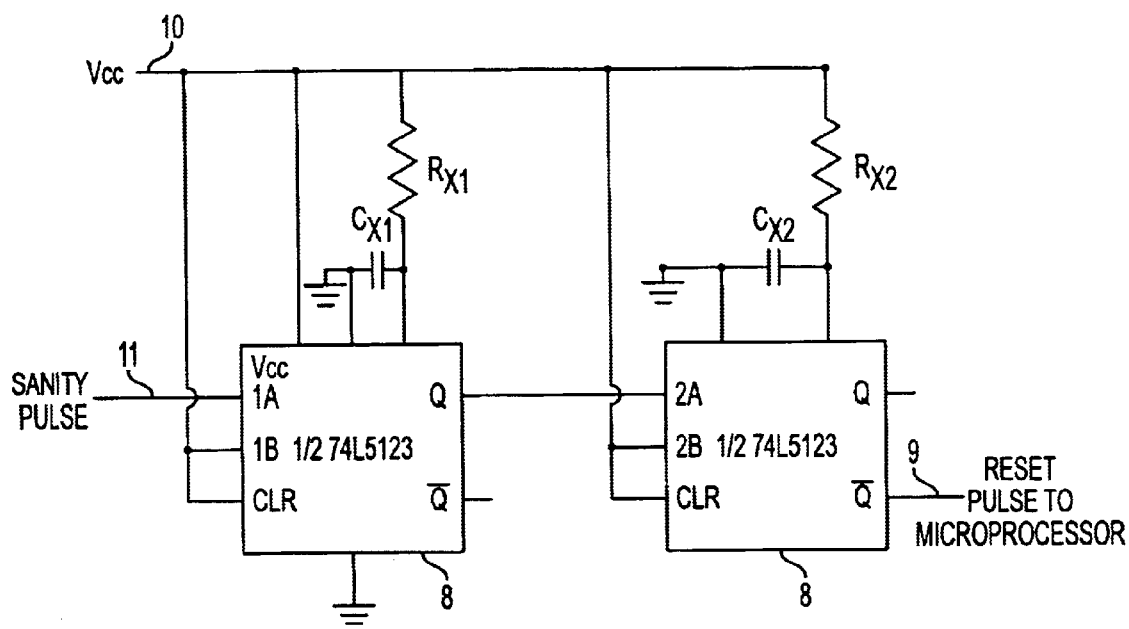
FIG. 2 shows a discrete prior art device for the recovery of system-level ESD problems in a computer keyboard.
Figure 3:
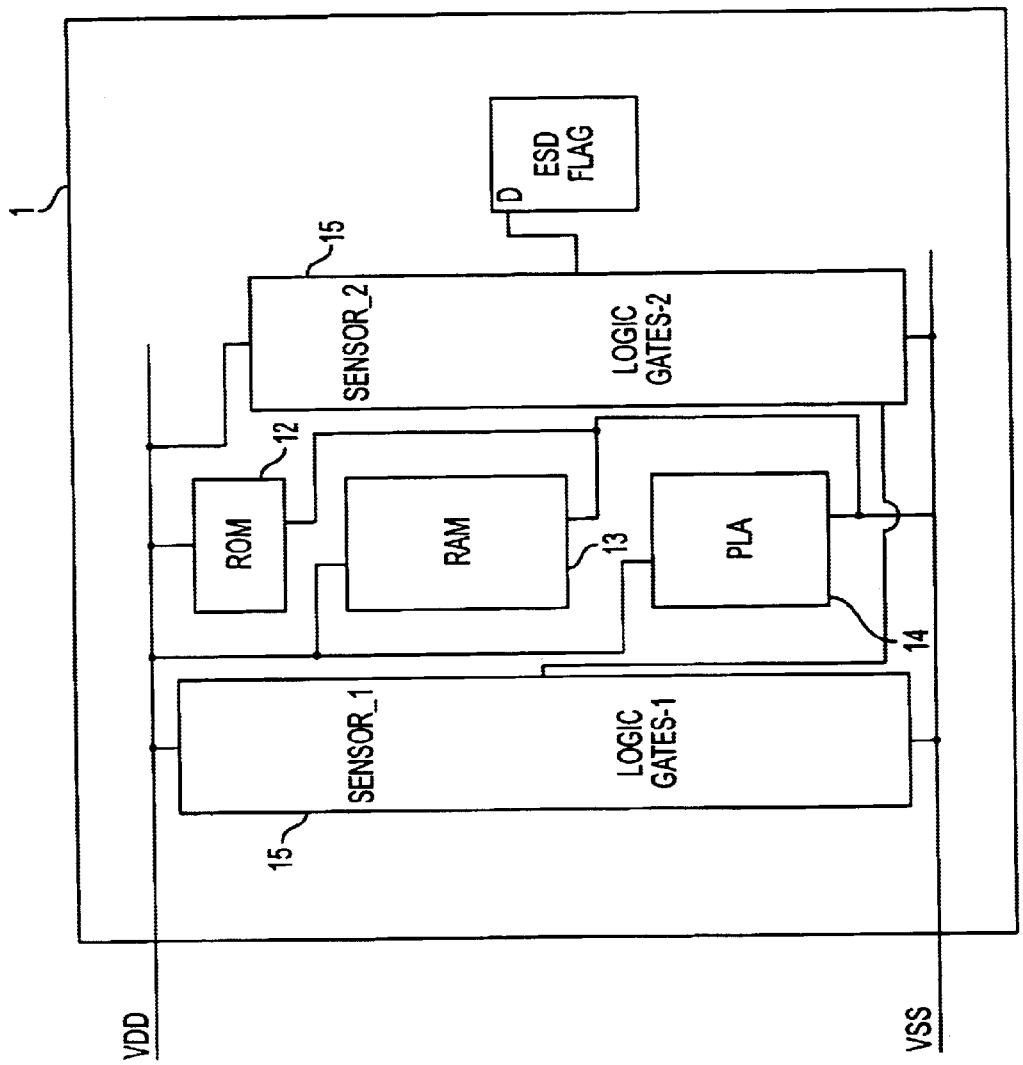
FIG. 3 shows an integrated circuit with a microprocessor including ESD sensors according to the present invention to detect the electrical transient on the VDD and VSS power lines in the microcontroller during the system-level ESD tests.

Presently, an 8-bit microcontroller, compatible with the Intel 8051 microprocessor, is widely used as the main microprocessor/microcontroller in keyboard products for general PC applications. FIG. 3 is a general sketch of a microprocessor 1 according to the present invention, including ROM 12, RAM 13, PLA 14 and logic gates having multiple electrostatic discharge sensors randomly arranged within the logic blocks of the chip layout of the microcontroller IC. The microprocessor 1 can be highly compact because it does not require any discrete components such as magnetic cores, ferrite beads, or RC networks for ESD protection. The present invention enables, for example, a keyboard circuit board to employ only several capacitors and resistors. Without the necessity of a magnetic core, ferrite beads, or RC low-pass circuits, this keyboard circuit can sustain system-level ESD stresses greater than 8 kV in the contact-discharge testing method and greater than 15 kV in the air-discharge testing methods.

An 8-bit keyboard microprocessor/microcontroller IC must overcome component-level and system-level ESD problems. In order to protect the IC including a microprocessor/microcontroller from being damaged by the ESD energy in the component phase, some on-chip ESD protection circuits should be included in various locations of the IC. To protect an 8-bit keyboard microcontroller with a shrunken die size fabricated in a 0.45-$\mu$m CMOS (complementary metal oxide semiconductor) technology, a whole-chip ESD protection scheme, which cooperates with an area-efficient VDD-to-VSS ESD clamp circuit, is used to provide a component-level human body model (HBM) ESD robustness of greater than 5 kV. The whole-chip ESD protection scheme has been disclosed in M. -D. Ker, "Area-Efficient VDD-to-VSS ESD Protection Circuit," U.S. Pat. 5,744,842, April, 1998. With such high component-level ESD robustness, the 8-bit keyboard microcontroller used in the keyboard assembly, has rarely, if ever, been returned for defects by field customers.

In addition to the aforementioned component-level ESD problems, the keyboard, including the 8-bit keyboard microcontroller, must be tested in the system-level ESD events to verify the system-level electromagnetic compatibility susceptibility. In the test standard of IEC 801-2, two methods are specified to discharge the ESD energy, which are the "air-discharge method" and the "contact-discharge method." The keyboard in PC system applications is required to sustain both the 4 kV contact-discharge ESD events and the 8 kV air-discharge events without any keyboard operating error or upset. In this invention, a hardware/firmware co-design method in an 8-bit keyboard microcontroller is provided to fix the system-level ESD problem on keyboard products without using additional discrete components.

Figure 4:
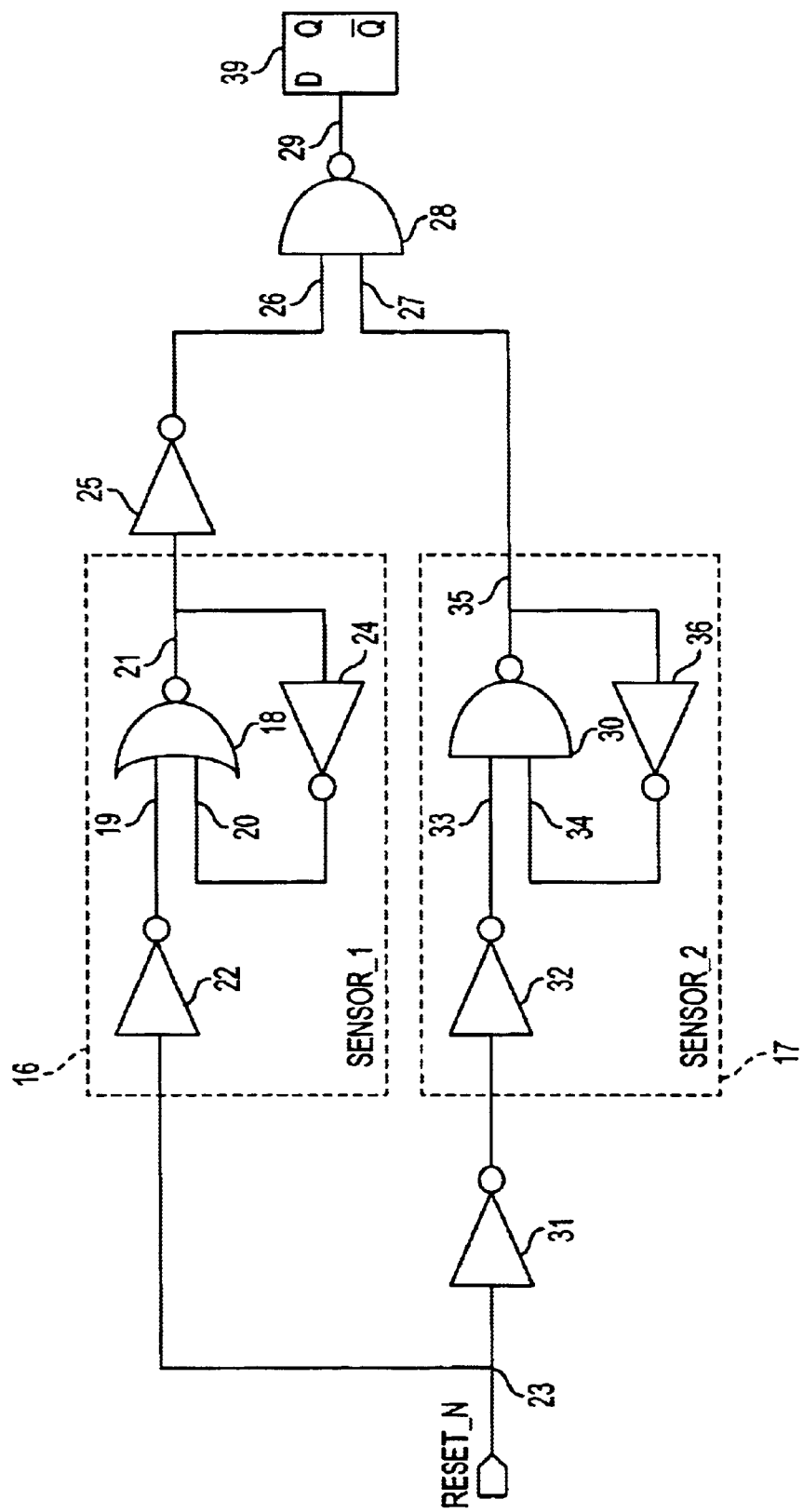
FIG. 4 shows the configuration of the ESD sensor circuit and the flag circuit according to the present invention.

FIG. 4 shows a preferred embodiment of a circuit employing first and second onchip ESD sensors 16, 17, where two latch logic gates are used as ESD sensors 16, 17 to detect the system-level electrical transient. An electrostatic discharge flag 39 is typically, for example, a D flip-flop.

Sensor 16 comprises a NOR gate 18, which during a general power-on reset operation or an ESD recovery operation, receives a reset pulse on line 19 from the output of reset_N line 23, via inverter 22. The output line 21 of NOR gate 18 is both fed back to its input line 20 through inverter 24, and exits sensor 16 to inverter 25, the output of which is provided to input line 26 of NAND gate 28.

Sensor 17 differs from sensor 16 in that it includes a NAND gate 30 having an input line 33, which during either a general power-on reset operation or an ESD recovery operation, receives a reset pulse from reset_N line 23 through inverter 31 (which is outside the sensor circuit) and then enters sensor 17 through a second inverter 32. The output line 35 of NAND gate 30 is fed back to its input line 34 through inverter 36. The output line 35 is also connected to input line 27 of NAND gate 28, which is outside the sensor circuit.

The output of line 29 of NAND gate 28 sets the electrostatic discharge flag 39 to logic 1 upon receipt of an indication of a transient voltage received by either of sensors 16, 17 along respective lines 26 and 27.

To increase the ability of each respective sensor to detect negative and positive fast transient voltages, sensor 17 is constructed such that the NMOS (N-type metal oxide semiconductor) in the inverters has a larger width to length (W/L) ratio than that of its PMOS (P-type metal oxide semiconductor) to make the latch lock easily at logic 0. In contrast, the PMOS in the sensor 16 has a larger W/L ratio than that of its NMOS to make the latch lock easily at logic 1.

In addition, the voltage detection levels of each of the sensors 16, 17 may be adjusted by changing the respective W/L ratios of each sensor. The sensitivity of the on-chip ESD sensors may be enhanced by adding capacitors (not shown) between the latch nodes and the VDD line or the VSS line. With this arrangement, the on-chip sensor is able to detect the system-level electrical transient.

Figure 5A:
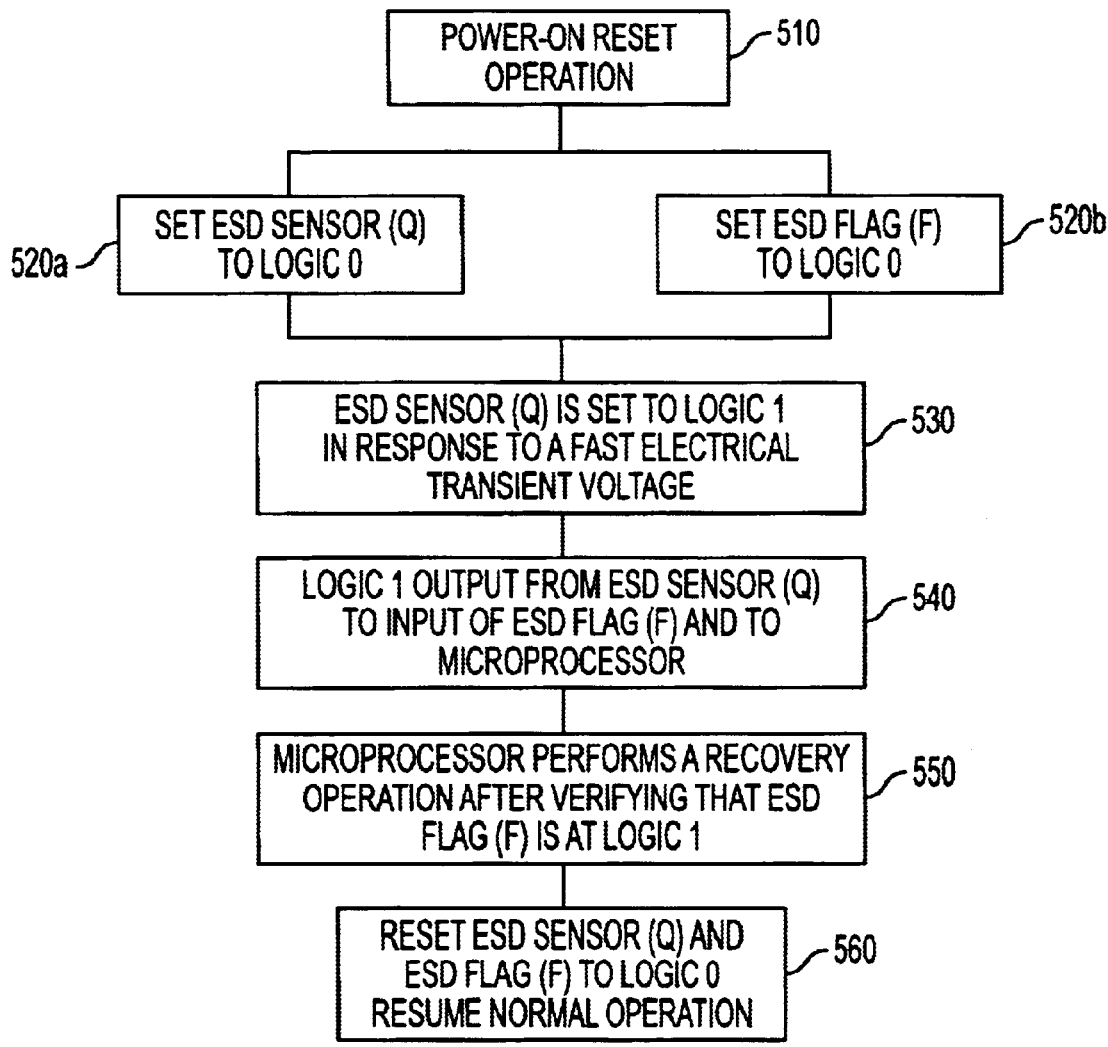
FIGS. 5A and 5B are firmware flowcharts for the reset subroutine procedure of a microprocessor/microcontroller if the ESD sensor detects the transient voltage in the keyboard during the system-level ESD stress tests.
Figure 5B:
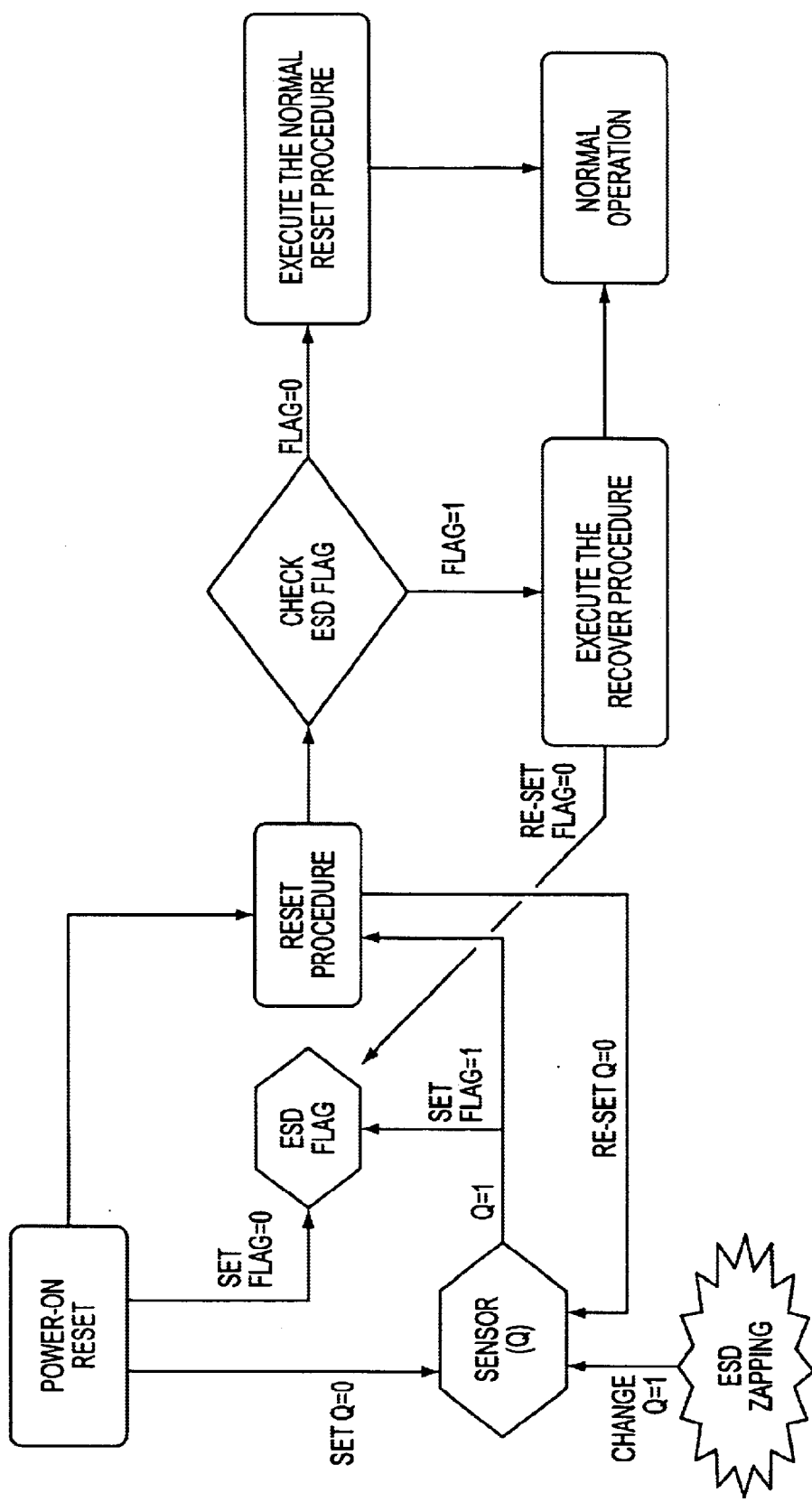

FIG. 5A is a flow chart illustrating automatic recovery by a microprocessor/microcontroller from fast electrical transient voltages in accordance with the present invention. FIG. 5B illustrates this same operation in a different format.

In FIG. 5A, at step 510 the microprocessor/microcontroller is started by a power-on-reset operation. The normal power-on reset procedure sets electrostatic discharge sensor (Q) to a logic 0 (step 520(a)) and sets an electrostatic discharge flag (F) to a logic 0 (step 520(b)).

The electrostatic discharge sensor (Q) is subsequently set to a logic 1 (step 530) after an ESD transient voltage is sensed by the electrostatic discharge sensor (Q). This change in status occurs from an electrostatic discharge verification test, or from an actual occurrence of ESD "zapping." At step 540, the electrostatic discharge sensor (Q) outputs a logic 1 to the input of the electrostatic discharge flag (F) and starts a recovery operation of the microcontroller. The electrostatic discharge flag (F) is latched at logic 1.

The recovery operation (step 550) is performed after verifying the status of the electrostatic discharge flag (F). The recovery procedure (step 570) is immediately invoked to recover all keyboard functions without performing a normal (general) poweron reset operation which is disruptive to the user. If the status of the electrostatic discharge flag is a logic 1, this signifies an ESD event caused one of the sensors to change states.

Figure 6:
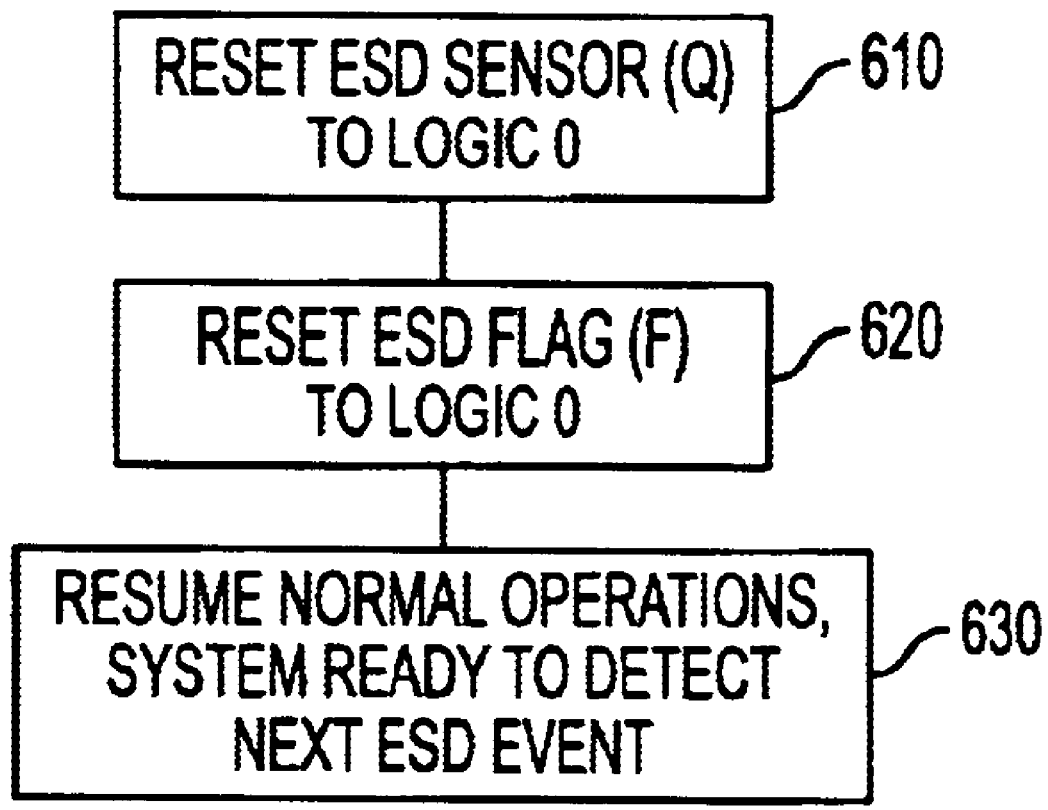
FIG. 6 is a flowchart showing steps of the recovery procedure of that are activated if the microprocessor/microcontroller determines that the electrostatic discharge flag is set to logic 1.

FIG. 6 shows a flowchart of the recovery procedure of step 560 of FIG. 5. At step 610 the electrostatic discharge sensor (Q) is reset to logic 0; at step 620 the electrostatic discharge flag (F) is reset to logic 0. The entire process takes no more than several milliseconds. At step 630, normal operations resume, and the electrostatic discharge sensor (Q) and the ESD flag (F) are ready to detect the next ESD event. In the case of multiple electrostatic discharge sensors having their outputs tied (OR'ed) together, all of the electrostatic discharge sensors are reset to 0 during a recovery operation.

To investigate an electrical transient happening to the microcontroller during the system-level ESD test on the keyboard, the voltage waveforms on both the VDD and VSS pins of the microcontroller IC in the keyboard are simultaneously monitored by an oscilloscope with a sampling rate of 2 Gs/s. The ESD device simultaneously used to generate the system-level ESD pulse in this experimental setup is the MiniZap ESD simulator produced by the Keytek Instrument Corp. To test the system-level ESD susceptibility of the keyboard, the keyboard is connected to a PC to verify whether the keyboard has any operating errors or upsets. In such a keyboard with the PC system, two test points must be hit by the ESD gun. One test point is the table having a metal plane where the keyboard and PC reside. The other test point is the backside of the PC case, which is where the keyboard cable is connected.

Figure 7:
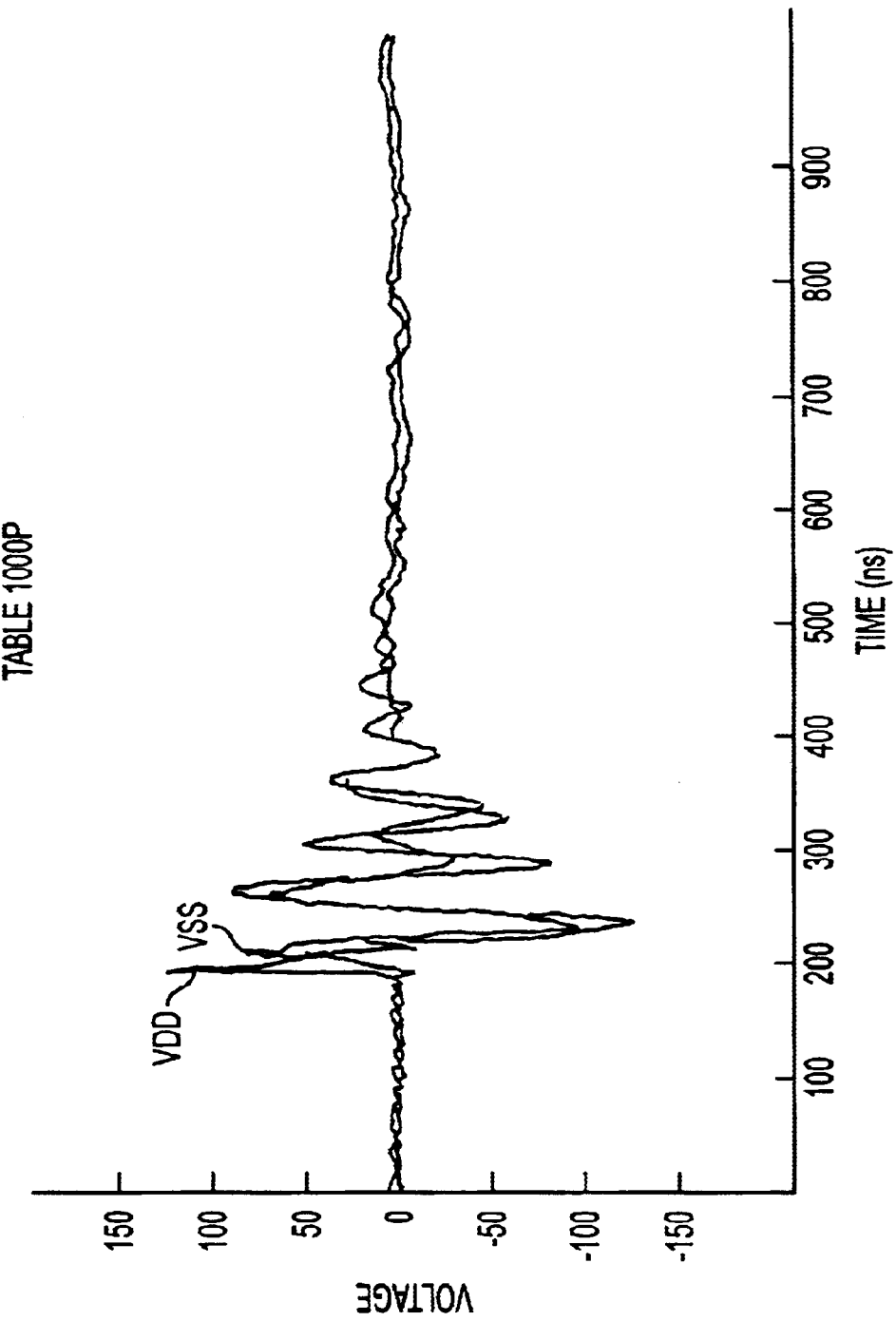
FIG. 7 shows measured VDD and VSS voltage waveforms on the microcontroller in the keyboard when the ESD gun (with a positive 1000-V ESD voltage) hits the table.
Figure 8:
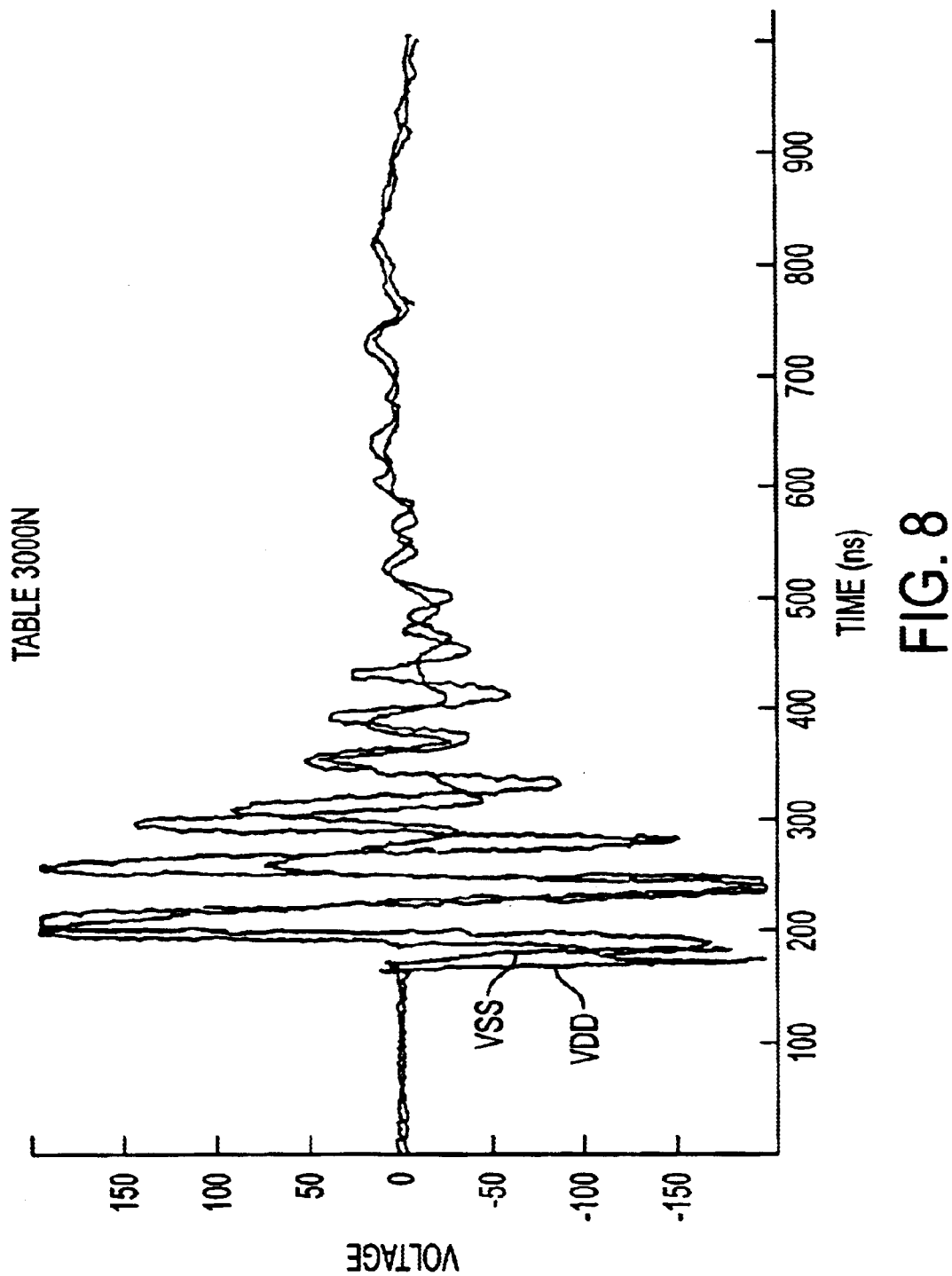
FIG. 8 shows measured VDD and VSS voltage waveforms on the microcontroller in the keyboard when the ESD gun with a negative 3000-V ESD voltage hits the table.

The measured voltage transition on the VDD and VSS pins of the microcontroller in the keyboard is shown in FIGS. 7–10. FIGS. 7 and 8 show the measured VDD and VSS voltage waveforms, when the ESD gun with a positive 1000 V or negative 3000 V ESD voltages hits the table in the contact-discharge method.

Figure 9:
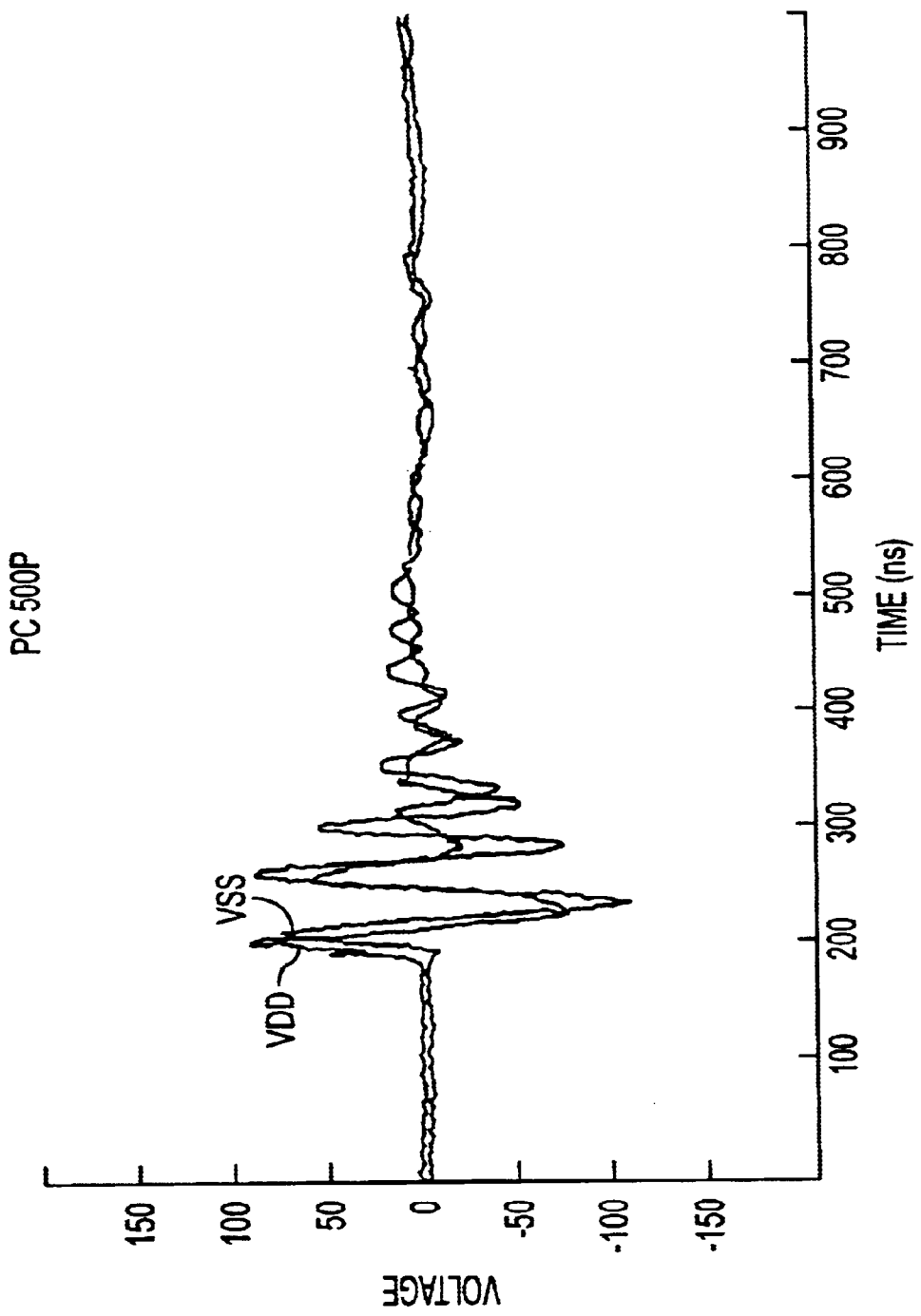
FIG. 9 shows measured VDD and VSS voltage waveforms on the microcontroller in the keyboard when the ESD gun with a positive 500-V ESD voltage hits the backside of the PC case.
Figure 10:
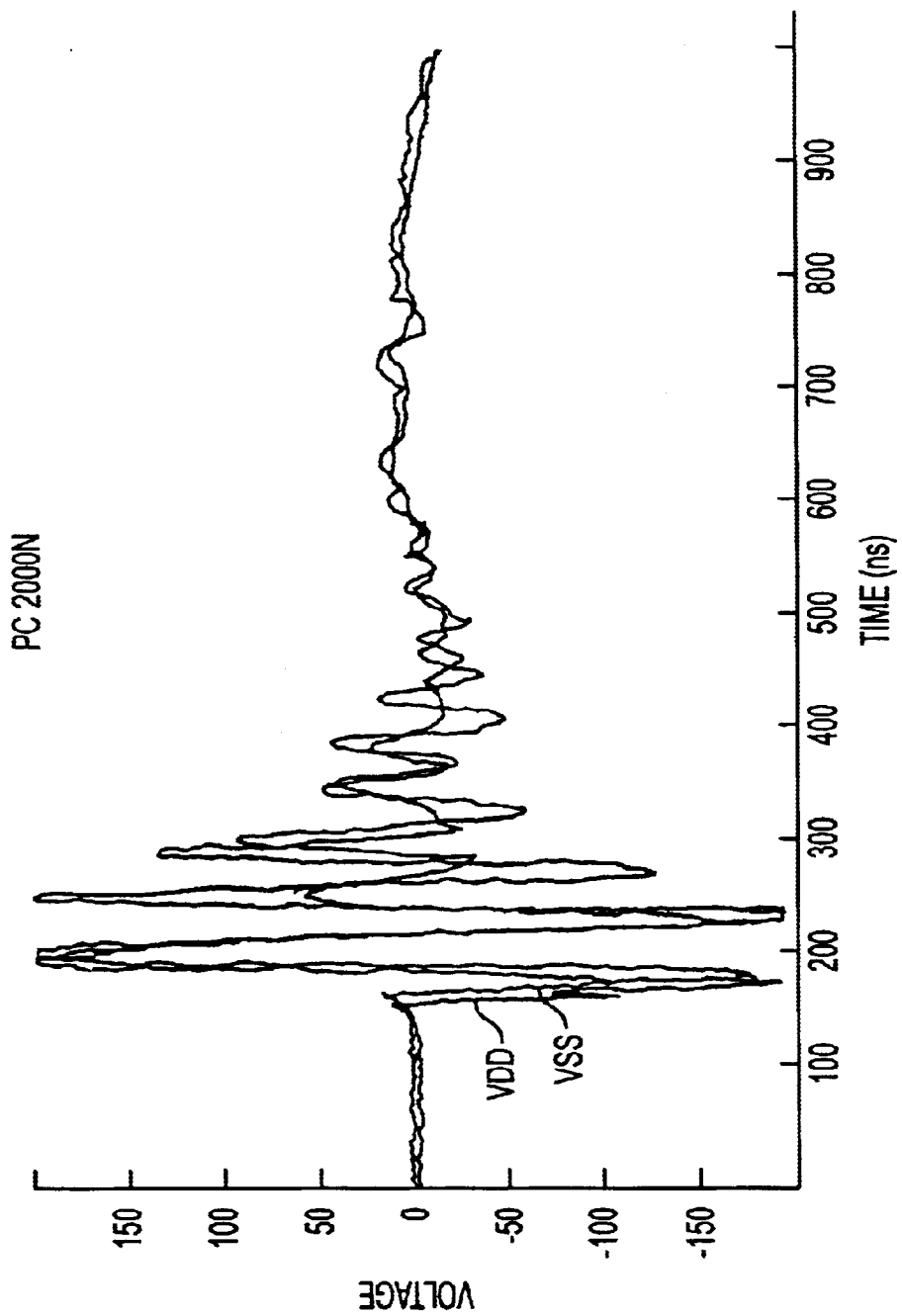
FIG. 10 shows measured VDD and VSS voltage waveforms on the microcontroller in the keyboard when the ESD gun with a negative 2000-V ESD voltage hits the backside of the PC case.
Figure 11A:
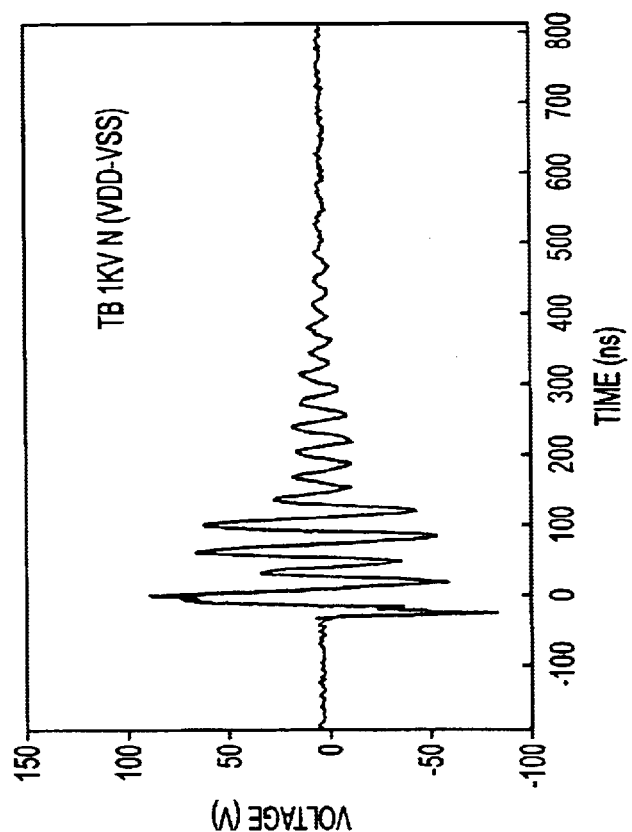
FIGS. 11(a) and 11(b) show the corresponding VDD-to-VSS voltage waveforms on the microcontroller in the keyboard during the system-level ESD test, when the ESD gun with a (a) 1000 V, and (b) 1000 V, ESD voltage hits the table.
Figure 11B:
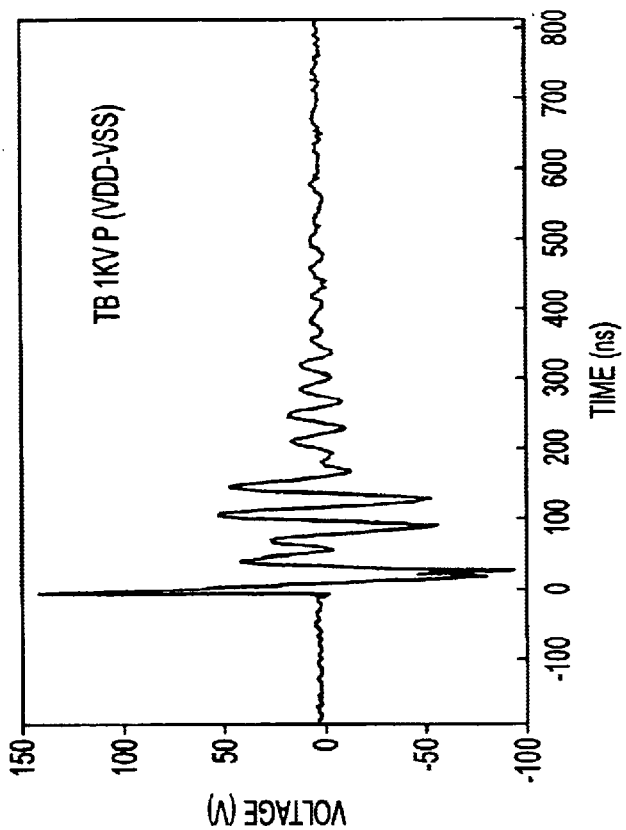
Figure 12B:
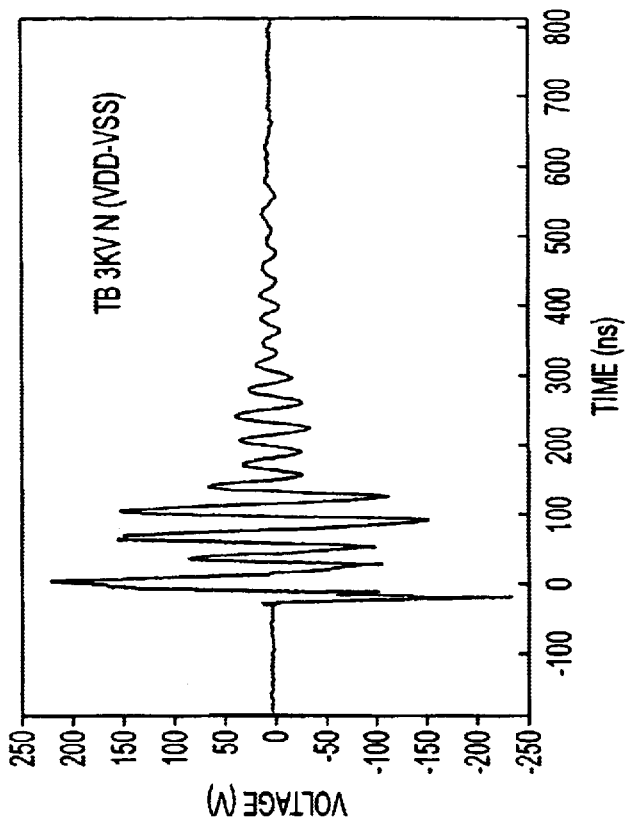
FIGS. 12(a) and 12(b) show the corresponding VDD-to-VSS voltage waveforms on the microcontroller in the keyboard during the system-level ESD test, when the ESD gun with a (a) 3000 V, and (b) −3000 V, ESD voltage hits the table.
Figure 12A:
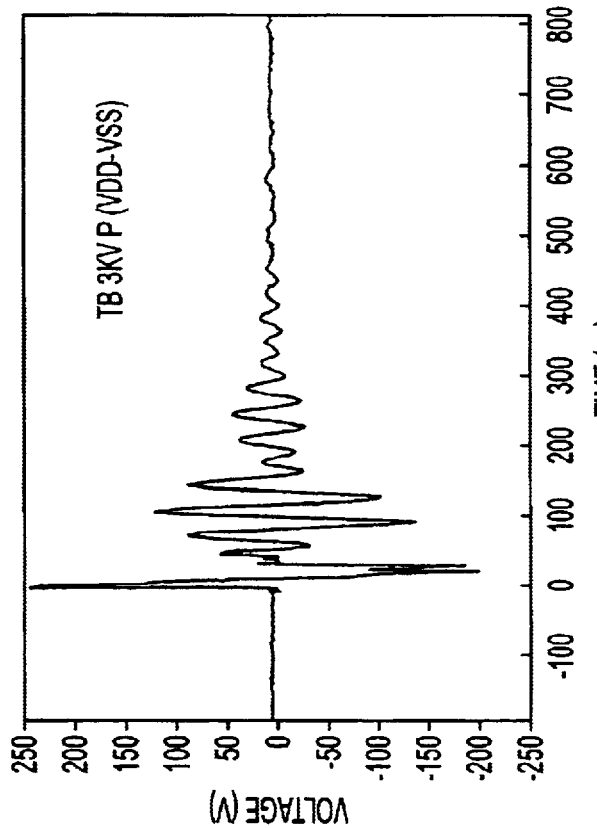
Figure 13A:
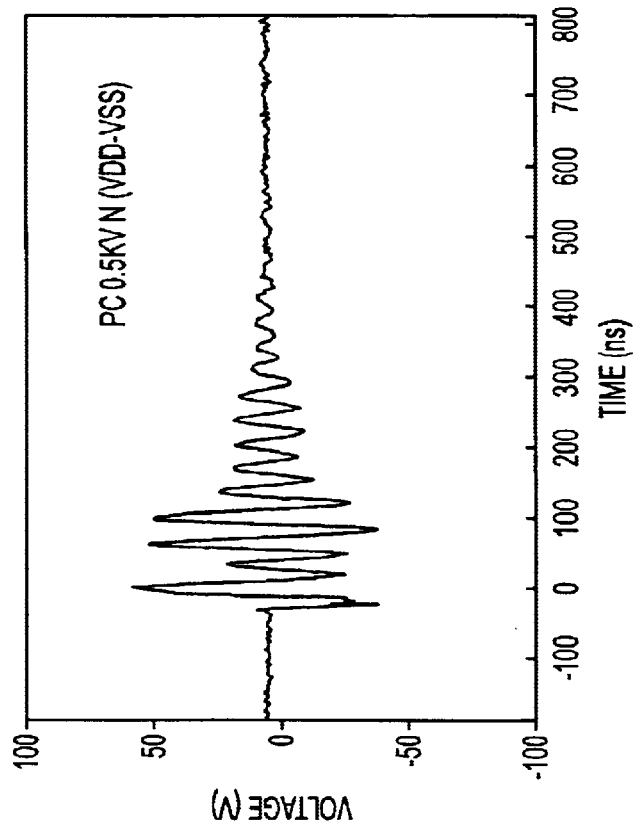
FIGS. 13(a) and 13(b) show the corresponding VDD-to-VSS voltage waveforms on the microcontroller in the keyboard during system-level ESD test, when the ESD gun with a (a) 500 V, and (b) −500 V, ESD voltage hits the backside of the PC case.
Figure 13B:
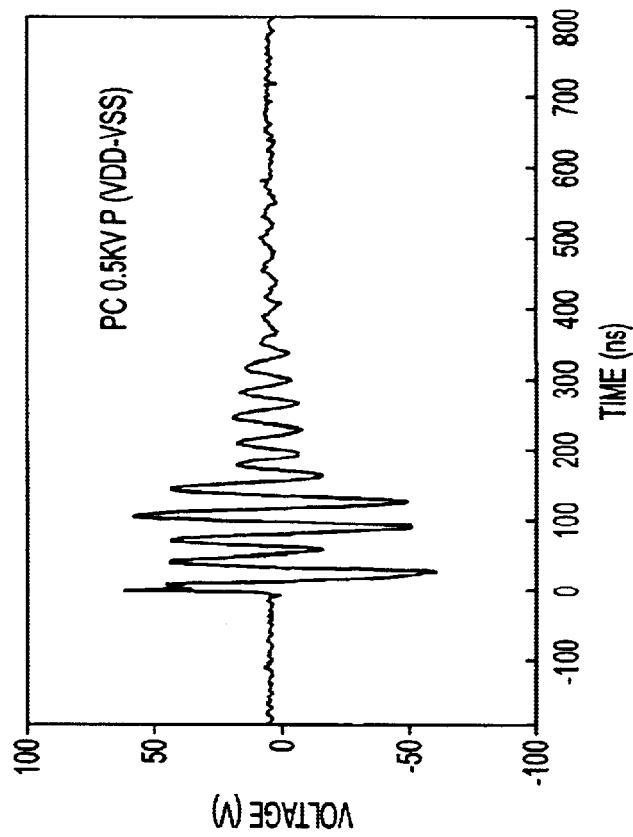
Figure 14A:
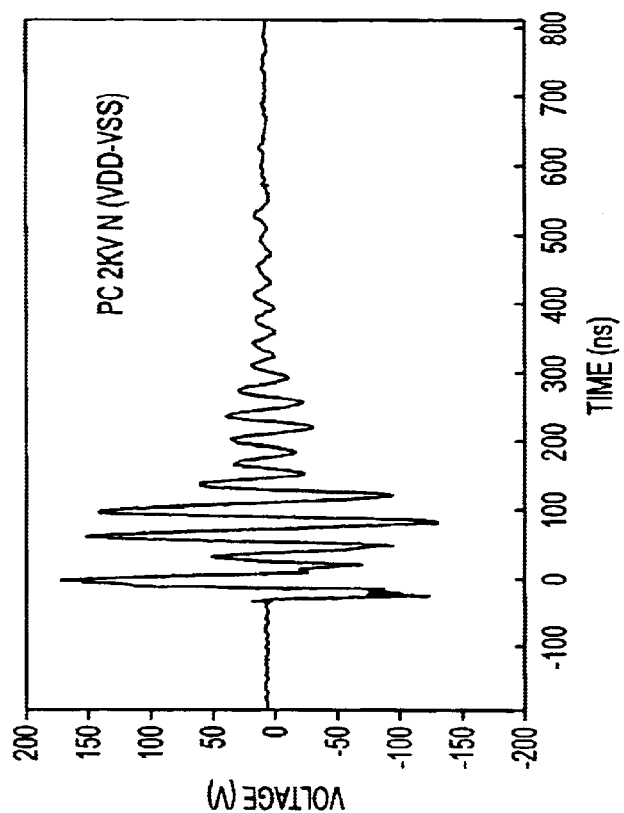
FIGS. 14(a) and 14(b) show the corresponding VDD-to-VSS voltage waveforms on the microcontroller in the keyboard during the system-level ESD test, when the ESD gun with a (a) 2000 V, and (b) −2000 V, ESD voltage hits the backside of the PC case.
Figure 14B:
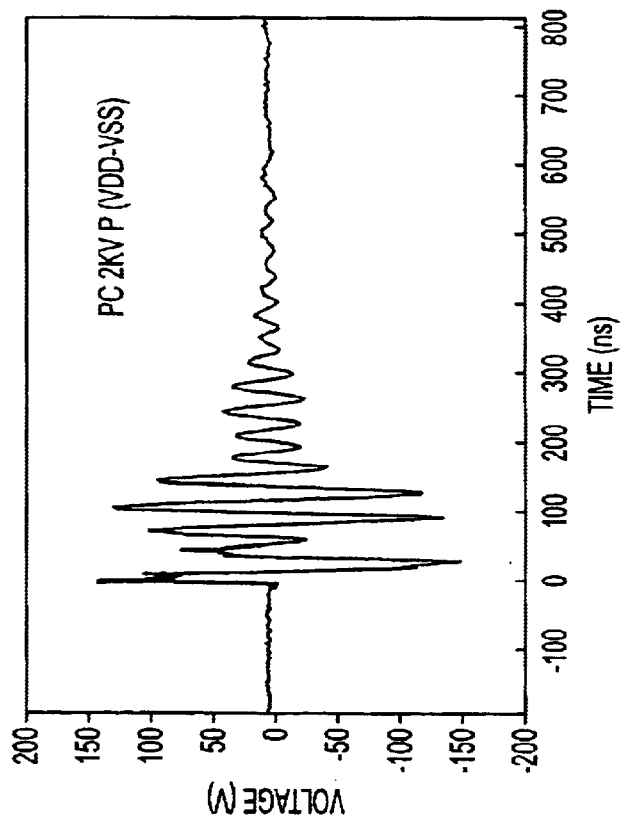
Figure 15B:
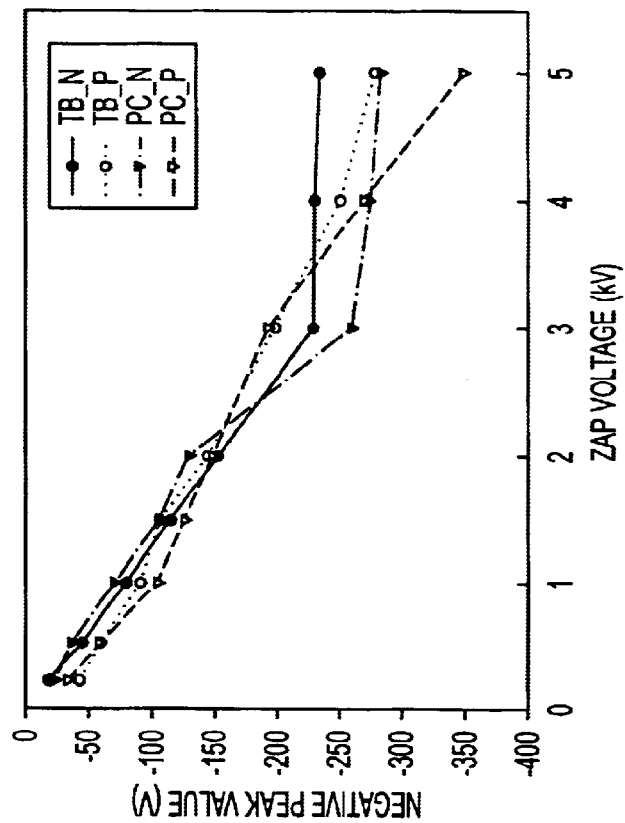
FIGS. 15(a) and 15(b) show the dependence of respective positive and negative voltage peaks in the VDD-to-VSS voltage waveforms on the ESD zapping voltage during the system-level ESD tests.
Figure 15A:
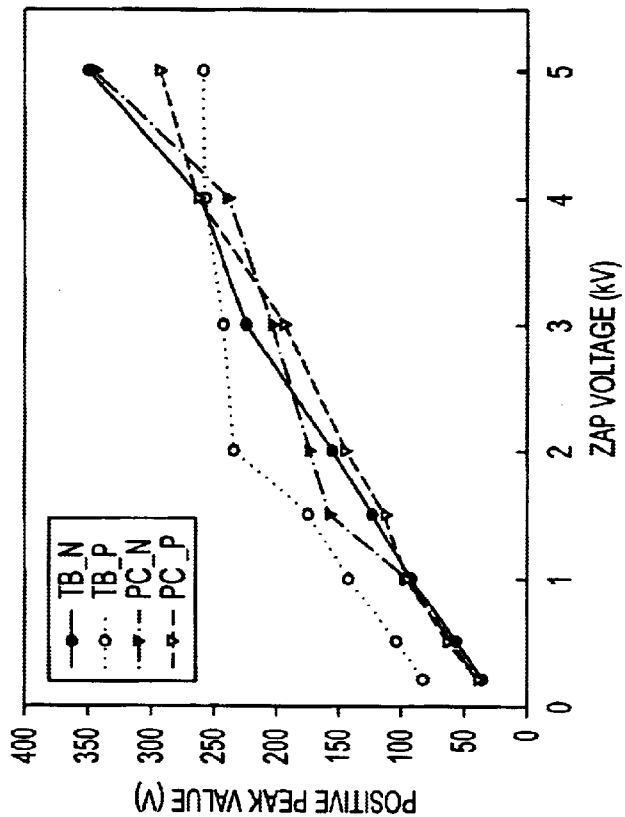

FIGS. 9 and 10 show the measured VDD and VSS voltage waveforns, when the ESD gun with a positive 500 V or negative 2000 V ESD voltage hits the backside of the PC case in the contact-discharge method.

The corresponding VDD-to-VSS voltage waveforms during such system-level ESD tests are shown in FIGS. 11–15. FIGS. 11(a) and 11(b) show the voltage difference between the VDD and VSS power pins of the microcontroller in the keyboard, when the ESD gun with a positive or negative 1000 V ESD voltage hits the table. FIGS. 12(a) and 12(b) show the voltage differences between the VDD and VSS power pins of the microprocessor/microcontroller, when the ESD guns hits the table with a positive or negative 3000 V ESD voltage, respectively. FIGS. 13(a) and 13(b) show results when an ESD voltage hits the backside of the PC case at positive and negative 500 volts, respectively. FIGS. 14(a) and 14(b) are similar to FIGS. 13(a) and 13(b) except that the respective voltage hitting the PC case is positive or negative 2000 V. FIGS. 15(a) and 15(b) show the dependence of the voltage peak in the corresponding VDD-VSS voltage waveforms on the ESD zapping voltage in the contact-discharge method. The larger ESD zapping voltage leads to higher voltage peak on the VDD-VSS voltage waveforms.

Figure 16:
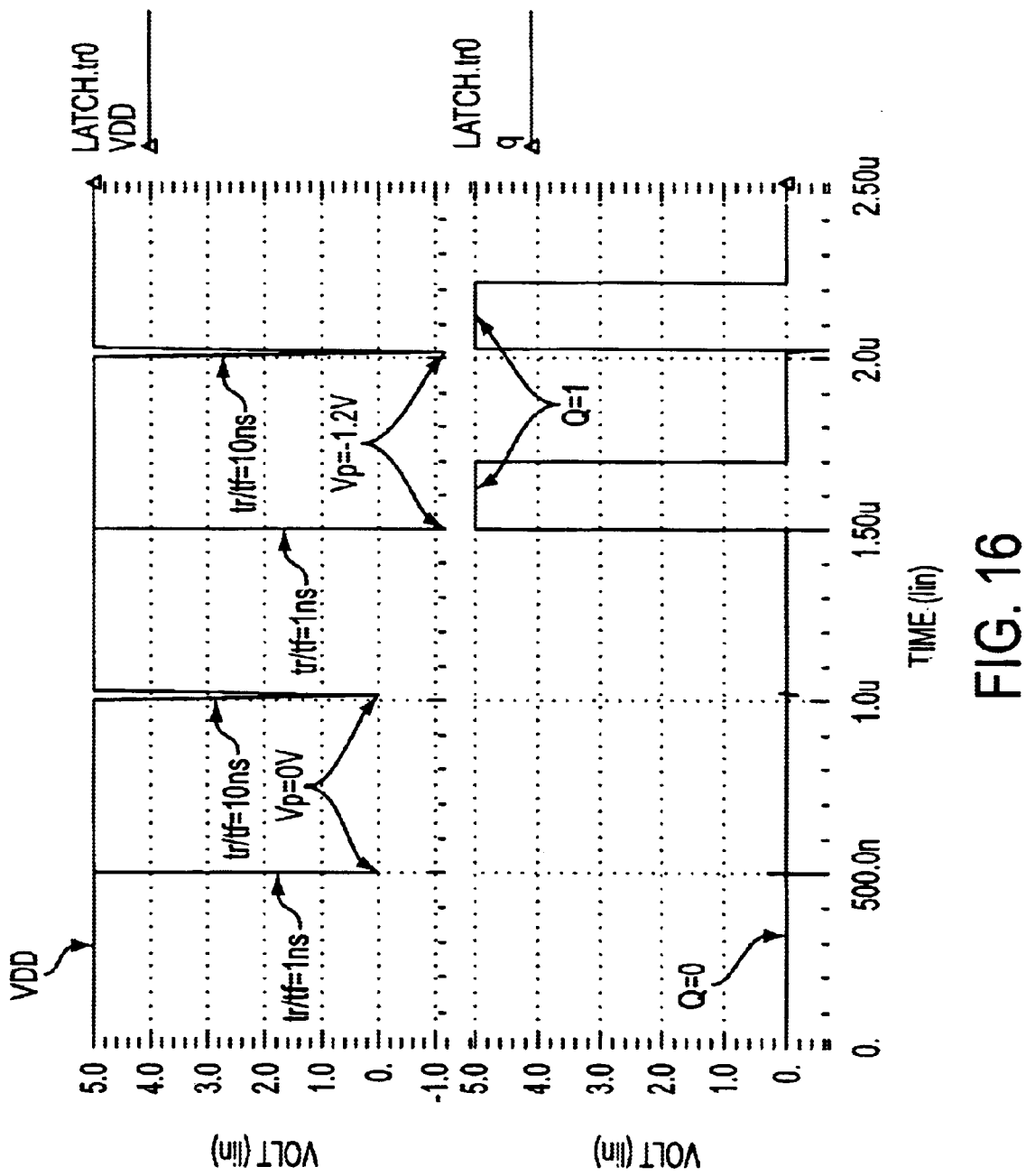
FIG. 16 shows HSPICE simulated results depicting the output Q of the electrostatic discharge sensor circuit having its state changed to logic 1 when the undershooting voltage glitches on the VDD drop to −1.2 V, when the VSS is biased at 0 V.
Figure 17:
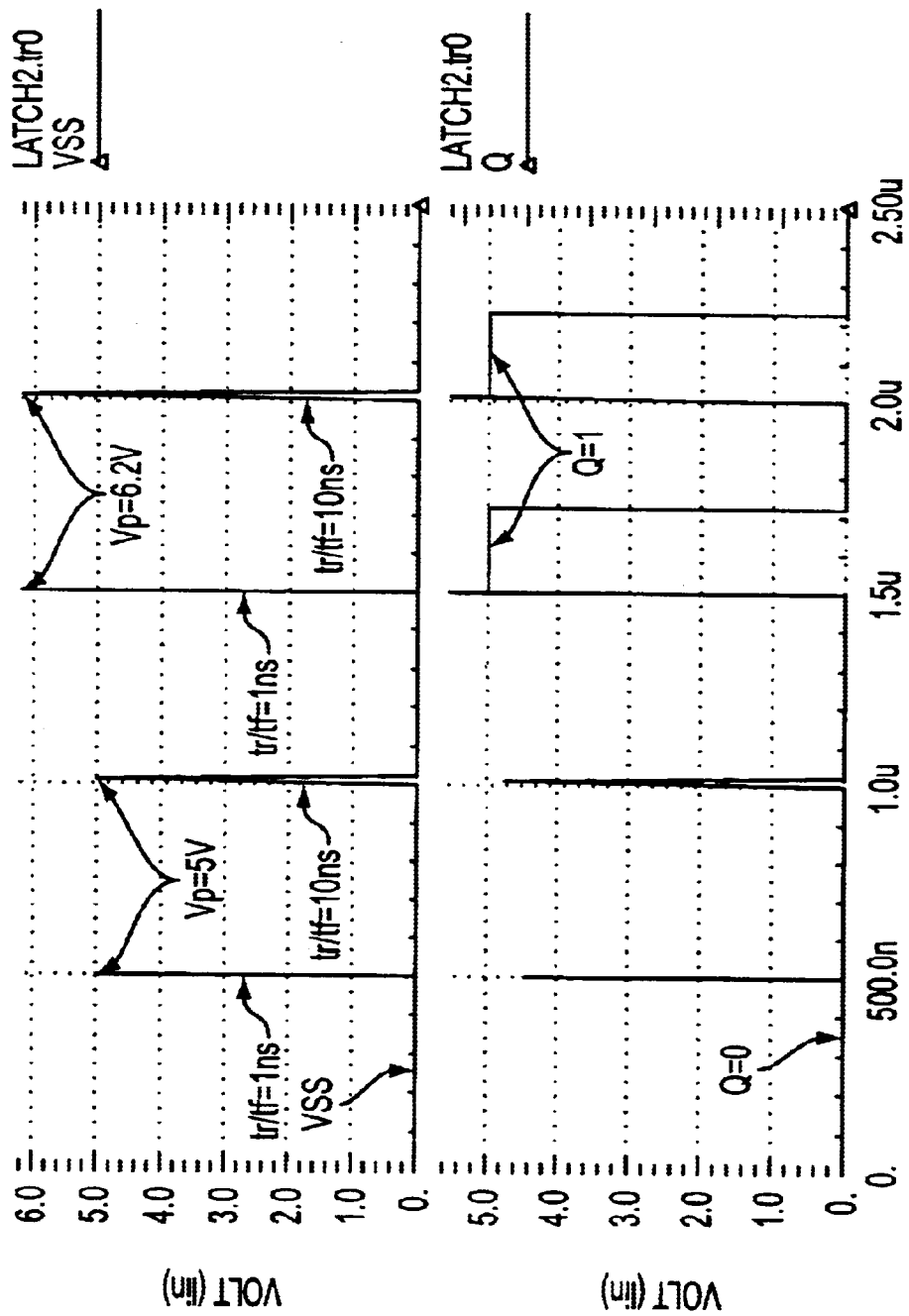
FIG. 17 shows HSPICE simulated results to depict the output Q of the electrostatic discharge sensor circuit having its state changed to logic 1 when the overshooting voltage glitches on the VSS rise up to 6.2 V, when the VDD is biased at 5 V.

The HSPICE simulated results are shown in FIGS. 16 and 17. In FIG. 16, the VDD voltage is originally kept at 5 V with a relatively stable VSS of 0 V, but some undershooting glitches from the system-level electrical transient are coupled to the VDD. The first (or second) glitch on the VDD voltage waveform in FIG. 16 has a respective rise or fall time of 1 ns (10 ns) and the undershooting voltage peak is 0 V, whereas sensor output Q still maintains at logic 0. The third (or fourth) glitch on the VDD voltage waveform in FIG. 16 has a respective rise or fall time of 1 ns (10 ns) and the undershooting voltage peak is –1.2 V, whereas the sensor output Q changes its state from logic 0 to logic In FIG. 17, the VSS voltage is originally kept at 0 V with a relatively stable VDD of 5 V but some overshooting glitches from the system-level electrical transient are coupled to the VSS. The first (or second) glitch on the VSS voltage waveform in FIG. 17 has a respective rise or fall time of Ins (10 ns) and an overshooting voltage peak is 5 V, whereas the sensor output Q still maintains at logic 0 after the shooting transition. The third (or fourth) glitch on the VSS voltage waveform in FIG. 17 has a respective rise or fall time of ins (10 ns) and an overshooting voltage peak is 6.2 V, whereas the sensor output Q changes its state from logic 0 to logic 1. The voltage detection level of the ESD sensor on the undershooting or overshooting transient peaks can be adjusted by changing the device W/L ratios in the latch logic gates or the coupled capacitor. The HSPICE simulation can be used to fine tune the device sizes in the sensors to detect different overshooting or undershooting voltage levels coupling from the system-level electrical transient.

With multiple on-chip ESD sensors included in the microcontroller at different layout locations, the outputs from the multiple ESD sensors are collected together by an OR gate and then stored in an ESD flag which is formed by a typical D-type flip-flop. With the additional ESD flag, the detection results from the on-chip ESD sensors can be temporarily stored for firmware check. When the state Q=1 occurs, the microcontroller will simultaneously re-start the hardware recovery procedure in the microcontroller to avoid a keyboard operating error or upset.

Therefore, the firmware method, with the additional electrostatic discharge sensors and flag illustrated in FIG. 4, allows the microprocessor to execute the recovery procedure to recover all the keyboard functions to the PC system as soon as possible without a general power-on reset. The keyboard can be recovered within several milliseconds to obtain a nearly real-time response for the human to key-in data into the PC. After the reset or recovery procedures, the states in the ESD sensors and the ESD flag are reset to logic 0 for detecting the next ESD events.

EXPERIMENTAL RESULTS

The whole-chip layout of an 8-bit microcontroller with ESD sensors and ESD flag according to the present invention is shown in FIG. 3. The die size of this microcontroller is only about 1800×1800 $\mu m^2$ in a 0.45 $\mu m$ CMOS process with three metal layers. No discrete components, such as a magnetic core, ferrite beads, or low-pass RC filters, are added onto or coupled with the IC board. By using the proposed hardware and firmware co-design on the microcontroller, the system-level ESD susceptibility of the keyboard products with this 8-bit microcontroller can be improved from the original 2 kV (4 kV) to become greater than 8 kV (15 kV) in the contact-discharge (air-discharge) ESD testing method, regardless of whether the ESD zapping location is on the table or at the PC case.

In summary, the present invention provides a hardware and firmware co-design method to automatically recover an 8-bit microprocessor/microcontroller to solve the system-level ESD problem in keyboard products. The fast transient voltage waveforms on the VDD and VSS pins of the microcontroller in the keyboard can be detected by the on-chip ESD sensors, and the electrostatic discharge flag is incorporated into the microprocessor/microcontroller to enable the firmware to perform recovery of the keyboard after receiving an ESD transient voltage. Without adding any additional discrete component on the keyboard circuit board, the system-level ESD susceptibility of the keyboard has been successfully improved from the original 2 kV (4 kV) to become greater than 8 kV (15 kV) in the contact-discharge (air discharge) ESD zapping. The voltage level of the EFT (electrical fast transition) test on such a keyboard is improved from the original 500 V to become greater than 1.5 kV.

Although the present invention has been fully described by way of examples with reference to the accompanying drawings, it should be understood that numerous variations, modifications and substitutions, as well as rearrangements and combinations, of the preceding embodiments will be apparent to those skilled in the art without departing from the novel spirit and scope of this invention. For example, the electrostatic discharge flag can be any type of flip-flop, such as an RS or D-type flip-flop, or it can be a type of register. The speed by which the register changes states is more important than specific type. While FIG. 4 shows one logic arrangement for sensors 16, 17 to achieve the desired output, similar result may be obtained by using different combinations of logic gates other than NAND, NOR and INVERTER circuits, such as AND, OR, EXCLUSIVE OR, or the like, circuits.

What is claimed is:

1. A device for automatic recovery of an integrated circuit after occurrence of an electrostatic discharge received by said integrated circuit, said integrated circuit comprising at least one of a microprocessor and a microcontroller and having a VDD line and a VSS line, said device being incorporated into said integrated circuit, said device comprising:

(a) an electrostatic discharge sensor means, connected between said VDD and VSS lines, for sensing an electrostatic discharge voltage, associated with said electrostatic discharge, on said VDD and VSS lines, and for generating a sensor output signal when said electrostatic discharge voltage is sensed;

(b) an electrostatic discharge flag means for, in response to said sensor output signal, outputting a flag signal indicating sensing of said electrostatic voltage by said sensor means; and (c) control means for (i) performing a reset procedure on said integrated circuit in response to power-on of said integrated circuit and (ii) performing a recovery procedure to restore predetermined functions of said integrated circuit in response to said flag signal indicating sensing of said electrostatic voltage by said sensor means, wherein said reset procedure comprises a first set of operations and said recovery procedure comprises a second set of operations which is different from said first set of operations, and said second set of operations is a subset of said first set of operations.

2. A device according to claim 1, wherein said second set of operations is an overlapping set of said first set of operations.

3. An apparatus according to claim 1, wherein said electrostatic discharge flag means is a D flip-flop.

4. A device for automatic recovery of an integrated circuit after occurrence of an electrostatic discharge received by said integrated circuit, said integrated circuit comprising at least one of a microprocessor and a microcontroller and having a VDD line and a VSS line, said device being incorporated into said integrated circuit, said device comprising:

(a) an electrostatic discharge sensor means, connected between said VDD and VSS lines, for sensing an electrostatic discharge voltage, associated with said electrostatic discharge, on said VDD and VSS lines, and for generating a sensor output signal when said electrostatic discharge voltage is sensed;

(b) an electrostatic discharge flag means for, in response to said sensor output signal, outputting a flap signal indicating sensing of said electrostatic voltage by said sensor means; and (c) control means for (i) performing a reset procedure on said integrated circuit in response to power-on of said integrated circuit and (ii) performing a recovery procedure to restore predetermined functions of said integrated circuit in response to said flag signal indicating sensing of said electrostatic voltage by said sensor means, wherein said sensor means includes a plurality of electrostatic discharge sensors located at different positions within said integrated circuit, and said device further comprises logic means for logically combining outputs of said plurality of electrostatic discharge sensors to provide a logical input to said electrostatic discharge flag means.

5. An apparatus according to claim 4, wherein said logic means comprises an OR gate.

6. An apparatus according to claim 4, wherein said logic means comprises a NAND gate.

7. An apparatus according to claim 4, wherein said plurality of electrostatic discharge sensor means comprises a first electrostatic discharge sensor having a larger NMOS width/length (W/L) ratio than its PMOS W/L ratio and a second electrostatic discharge sensor having a larger PMOS W/L ratio than its NMOS W/L ratio.

8. An apparatus according to claim 4, wherein said electrostatic discharge flag means is a D flip-flop.

9. A method of performing an automatic recovery procedure for an integrated circuit after occurrence of an electrostatic discharge received by said integrated circuit, said integrated circuit having a VDD line and a VSS line and comprising at least one of a microprocessor and a microcontroller, said method comprising the steps of:

(a) starting said integrated circuit by a power-on reset sequence including setting an electrostatic discharge flag at a first logic state;

(b) sensing an electrostatic discharge voltage on said VDD and VSS lines;

(c) chancing the electrostatic discharge flag to a second logic state in response to said sensing of said electrostatic discharge voltage on said VDD and VSS lines;

(d) performing a recovery procedure to restore predetermined functions of said integrated circuit in response to said flag being set in step (b) to said second logic state; and (e) after step (d), resetting said flag to said first logic state, wherein step (b) is performed by an electrostatic discharge sensor and said power-on reset sequence of step (a) further includes setting an output of said sensor to said first logic state, step (c) includes changing said flag to said second logic state in response to said setting of said output of said sensor to said second logic state, and step (e) further includes resetting said output of said sensor to said first logic state.

10. A method as in claim 9, wherein said first logic state is logic 0 and said second logic state is logic 1.

11. A method of performing an automatic recovery procedure for an integrated circuit after occurrence of an electrostatic discharge received by said integrated circuit, said integrated circuit having a VDD line and a VSS line and comprising at least one of a microprocessor and a microcontroller, said method comprising the steps of:

(a) starting said integrated circuit by a power-on reset sequence including setting an electrostatic discharge flag at a first logic state;

(b) sensing an electrostatic discharge voltage on said VDD and VSS lines;

(c) changing the electrostatic discharge flag to a second logic state in response to said sensing of said electrostatic discharge voltage on said VDD and VSS lines;

(d) performing a recovery procedure to restore predetermined functions of said integrated circuit in response to said flag being set in step (b) to said second logic state; and (e) after step (d), resetting said flag to said first logic state, wherein said reset procedure comprises a first set of operations and said recovery procedure comprises a second set of operations which is different from said first set of operations, and said second set of operations is a subset of said first set of operations.

12. A method according to claim 11, wherein said second set of operations is an overlapping set of said first set of operations.

* * * * *